United States Patent
Zhang et al.

(10) Patent No.: US 12,414,157 B2
(45) Date of Patent: Sep. 9, 2025

(54) MULTIPLE VICTIM/AGGRESSOR COLLISION AVOIDANCE

(71) Applicant: QUALCOMM Incorporated, San Diego, CA (US)

(72) Inventors: Qian Zhang, Basking Ridge, NJ (US); Junyi Li, Fairless Hills, PA (US); Navid Abedini, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 17/658,788

(22) Filed: Apr. 11, 2022

(65) Prior Publication Data

US 2023/0328782 A1    Oct. 12, 2023

(51) Int. Cl.
| | |
|---|---|
| *H04W 74/0816* | (2024.01) |
| *H04B 17/336* | (2015.01) |
| *H04L 5/00* | (2006.01) |
| *H04W 24/10* | (2009.01) |

(52) U.S. Cl.
CPC ...... *H04W 74/0816* (2013.01); *H04B 17/336* (2015.01); *H04L 5/0051* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 2015/0146542 A1* | 5/2015 | Xia | H04L 5/0053 370/241.1 |
| 2017/0237478 A1 | 8/2017 | Kwak et al. | |
| 2019/0215086 A1 | 7/2019 | Kwak et al. | |
| 2019/0239245 A1 | 8/2019 | Davydov et al. | |
| 2019/0342057 A1 | 11/2019 | Rico Alvarino et al. | |
| 2020/0052767 A1 | 2/2020 | Wang et al. | |
| 2020/0077286 A1* | 3/2020 | Liu | H04W 24/08 |
| 2020/0221323 A1 | 7/2020 | Xu et al. | |
| 2020/0260358 A1 | 8/2020 | Ratnam et al. | |
| 2020/0275482 A1 | 8/2020 | Oh et al. | |
| 2021/0219283 A1 | 7/2021 | Xue et al. | |
| 2022/0095240 A1* | 3/2022 | Ying | H04B 17/336 |
| 2022/0182843 A1* | 6/2022 | Park | H04L 25/0224 |
| 2022/0278788 A1* | 9/2022 | Pedersen | H04L 5/005 |

(Continued)

FOREIGN PATENT DOCUMENTS

| | | |
|---|---|---|
| EP | 3031283 A2 | 6/2016 |
| EP | 4022850 A1 | 7/2022 |

(Continued)

*Primary Examiner* — Lonnie V Sweet
(74) *Attorney, Agent, or Firm* — Patterson+ Sheridan, L.L.P.

(57) ABSTRACT

Certain aspects of the present disclosure provide techniques for wireless communication by a first network entity, comprising obtaining a first configuration for transmission of measurement reference signals (RS) by the first network entity, wherein the first configuration is adjusted based on information regarding one or more second configurations for transmission of measurement RS by one or more second network entities, and participating in a cross link interference (CLI) measurement procedure, in accordance with the first configuration.

29 Claims, 16 Drawing Sheets

(56) References Cited

U.S. PATENT DOCUMENTS

| | | | |
|---|---|---|---|
| 2022/0408275 A1* | 12/2022 | Awada | H04W 36/085 |
| 2023/0209587 A1 | 6/2023 | Zhang et al. | |
| 2023/0262499 A1 | 8/2023 | Zhang et al. | |
| 2024/0259837 A1* | 8/2024 | Soldati | H04L 5/0096 |

FOREIGN PATENT DOCUMENTS

| | | |
|---|---|---|
| WO | 2019192410 A1 | 10/2019 |
| WO | 2021012129 A1 | 1/2021 |
| WO | 2023212405 A1 | 11/2023 |

* cited by examiner

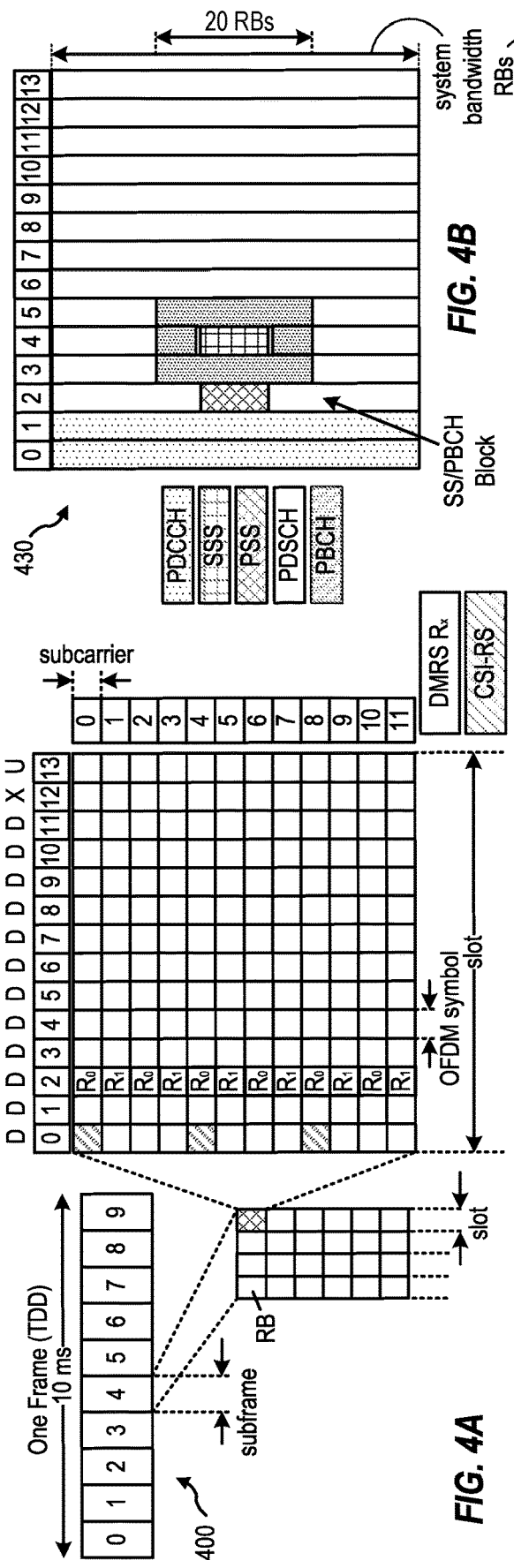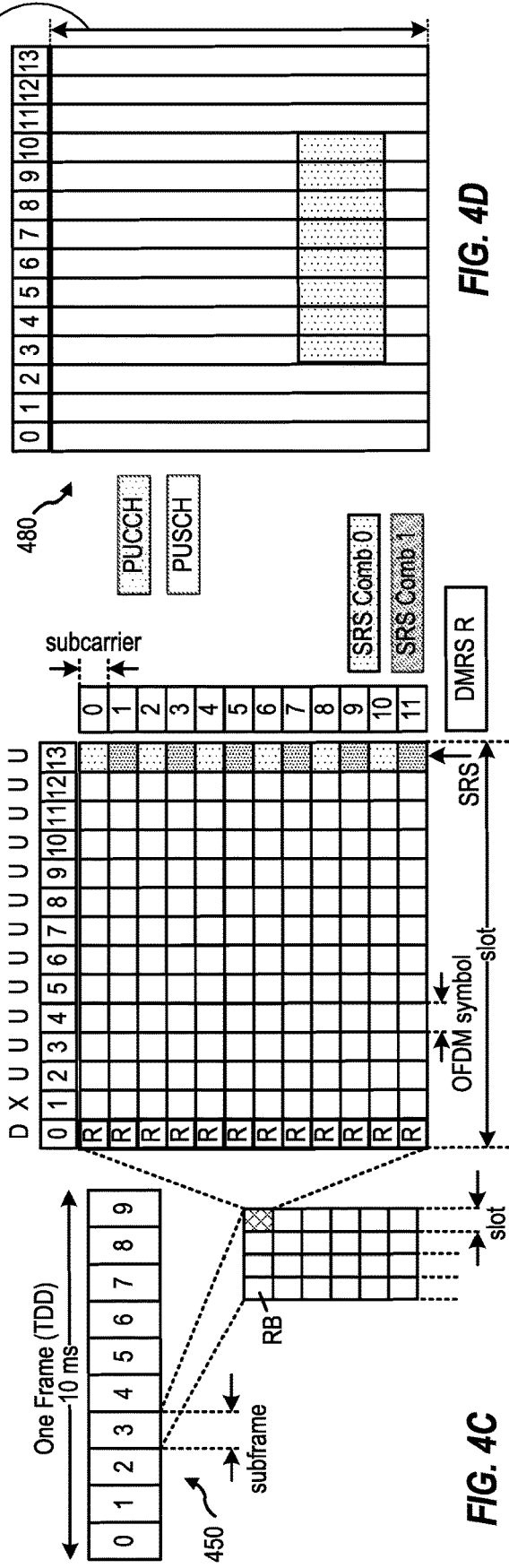

MULTIPLE VICTIM/AGGRESSOR COLLISION AVOIDANCE

BACKGROUND

Field of the Disclosure

Aspects of the present disclosure relate to wireless communications, and more particularly, to techniques for avoiding collisions resulting from interference between multiple network entities.

Description of Related Art

Wireless communications systems are widely deployed to provide various telecommunications services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a first network entity, including obtaining a first configuration for transmission of measurement reference signals (RS) by the first network entity, wherein the first configuration is adjusted based on information regarding one or more second configurations for transmission of measurement RS by one or more second network entities; and participating in a cross link interference (CLI) measurement procedure, in accordance with the first configuration.

One aspect provides a method for wireless communications by a second network entity, including obtaining information regarding a first configuration for transmission of measurement RS from a first network entity; and transmitting a request, to the first network entity, for adjustment of the first configuration, based on a comparison of the first configuration with a second configuration for transmission of measurement RS by a second network entity or another network entity.

One aspect provides a method for wireless communications by a central unit (CU), including determining a first configuration for transmission of measurement RS from a first network entity, based on information regarding one or more second configurations for transmission of measurement RS from one or more second network entities; and transmitting information regarding the first configuration to the first network entity.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Figure 1:
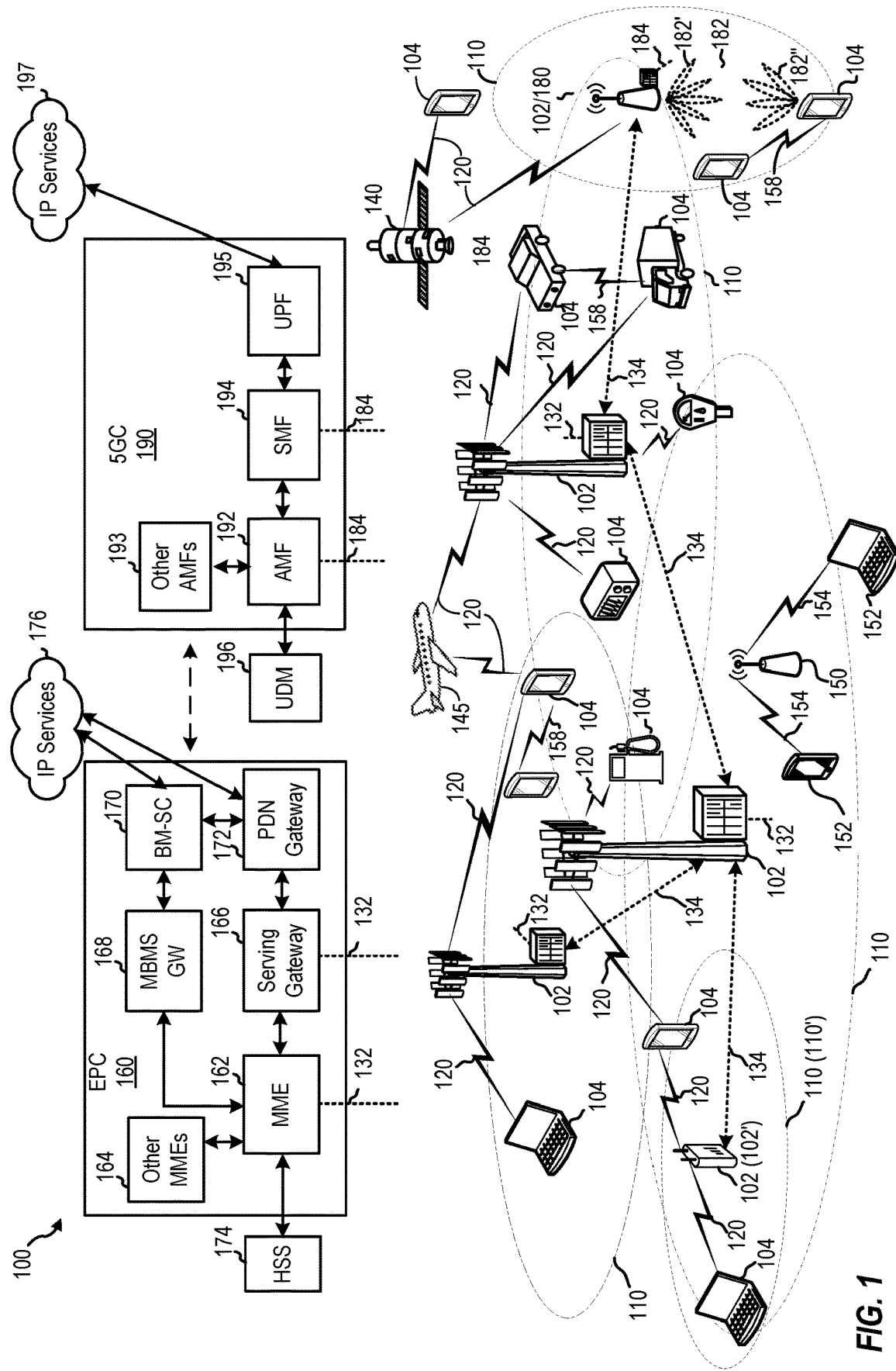
FIG. 1 depicts an example wireless communications network.

Aspects of the present disclosure provide apparatuses, methods, processing systems, and computer-readable mediums for avoiding collisions resulting from interference between multiple network entities.

The techniques may help mitigate wireless interference, for example, when a receiving network entity and a transmitting network entity communicate in a full duplex (FD) mode of communication. During FD communications, uplink (UL) and downlink (DL) transmissions may be performed simultaneously.

FD capability can be present at a network entity (e.g., a base station such as a gNB), at a UE, or at both. For instance, at a UE, uplink transmissions can use one antenna panel and downlink reception may use another antenna panel. Similarly, at a gNB, uplink reception can use one panel and downlink transmission can use another panel. FD capability is typically conditional on beam separation, for example, in order to mitigate self-interference between downlink and uplink signals as well as clutter echo (e.g., where uplink transmission echoes affect uplink transmission and/or downlink reception). Benefits of FD communication include latency reduction, as it is possible to receive downlink signals in (what would be) uplink only slots. FD communication may also help improve spectrum efficiency enhancement (per cell and/or per UE), more efficient resource utilization, and coverage extension.

One potential challenge with FD communication is how to manage interference caused by remote network entities, sometimes referred to as remote interference measurement (RIM). In current systems, a RIM framework may be used to help mitigate inter-gNB interference due to atmosphere ducting effects. Unfortunately, such RIM frameworks may not optimize the selected gNB beam to mitigate inter-gNB interference in case of gNB FD, and such procedures may be limited, for example, deactivated in absence of ducting effects.

For enhanced inter-gNB interference measurements, measurement reference signals (RS) can be sent from an aggressor gNB to a victim gNB in order to measure actual inter-gNB interference. In such cases, there could be multiple measurement RSs associated with multiple Tx(aggressor gNB)/Rx(victim gNB) beam pairs between aggressor gNB and victim gNB. The use of multiple measurement RSs creates a challenge, particular when there are multiple measurement RS transmissions (e.g., for n×n mutual measurements) between multiple Tx gNBs to multiple Rx gNBs.

Accordingly, aspects of the present disclosure provide techniques for interference mitigation by coordinating FD communications among multiple network entities by adjusting a configuration of measurement RSs. In current wireless systems, interference mitigation for interference occurring between network entities may be limited to interference that occurs only in certain environmental conditions (e.g., where ducting effects are presents). The various techniques presented herein enhance interference management between network entities independent of certain environmental conditions to optimize FD communication.

Aspects of the present disclosure provide techniques for negotiating and coordinating configurations of measurement reference signals RS between multiple network entities for interference measurement. Such techniques may allow for fewer collisions between a network entity's own transmission of measurement RSs and a neighboring network entity measurement RSs. Implementation may also allow transmission of measurement RSs to be received and efficiently measured by multiple neighboring network entities on the same RS resources to signaling reduce overhead.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
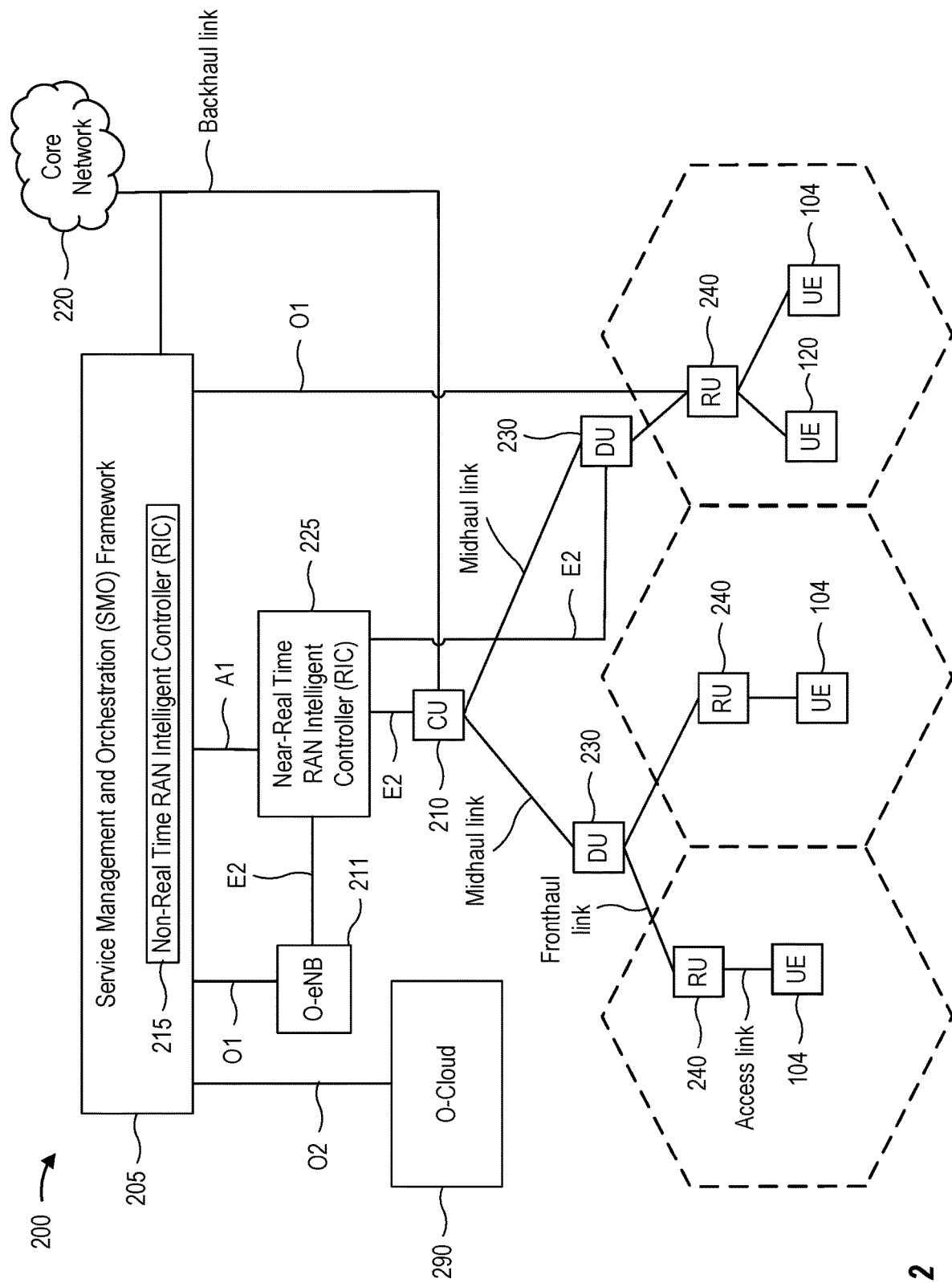
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". BS 180 may also receive the beamformed signal from UE 104 in one or more receive directions 182'. Base station 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit—User Plane (CU-UP)), control plane functionality (e.g., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
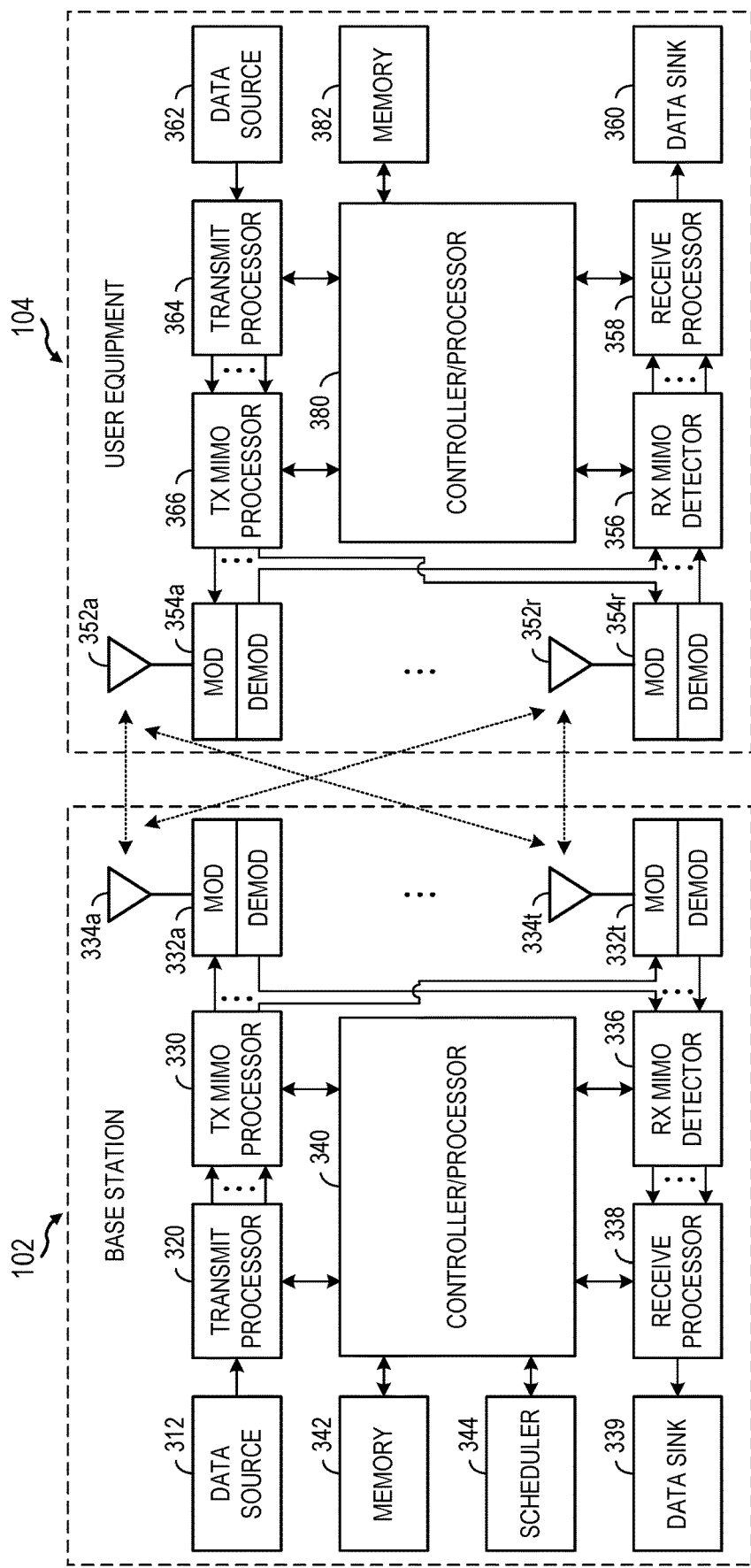
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Full Duplex Use Cases

Aspects of the present disclosure relate to wireless communications, and more particularly, to techniques for adjusting, based on communication with one or more network entities a configuration for transmission of measurement reference signals (RSs) in order to mitigate inter-gNB interference with coordination.

As noted above, in some cases, wireless communication devices, such as UEs and BSs, may communicate using multiple antenna panels. In some cases, the multiple antenna panels may be used for half-duplex (HD) communication, such as in current 5G new radio (NR) communication systems, in which downlink (DL) and uplink (UL) transmissions are transmitted non-simultaneously (e.g., transmitted in different time resources). HD communication may be considered baseline behavior in Release 15 (R-15) and 16 (R-16) of 5G NR. In other cases, the use of multiple antenna panels may allow for full duplex (FD) communication whereby uplink (UL) and downlink (DL) transmissions may be performed simultaneously (e.g., in the same time resources). For example, in some cases, UL transmission by the UE may be performed on one panel while DL reception may be performed simultaneously on another panel of the UE. Likewise, at a BS, DL transmission by the BS may be performed on one antenna panel while UL reception may be performed on another antenna panel.

FD capability may be conditioned on beam separation (e.g., frequency separation or spatial separation) and may still be subject to certain self-interference between UL and DL (e.g., UL transmission directly interferes with DL reception) as well as clutter echo (e.g., where UL transmission echoes affect UL transmission and/or DL reception). However, while FD capability may be subject to certain interference, FD capability provides for reduced transmission and reception latency (e.g., it may be possible to receive DL transmissions in an UL-only slot), increased spectrum efficiency (e.g., per cell and/or per UE), and more efficient resource utilization.

Figure 5A:
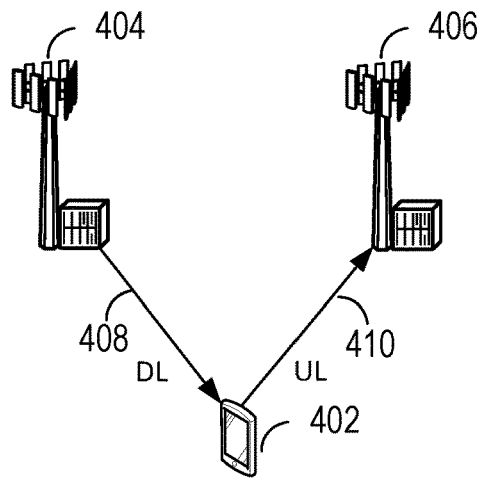
FIGS. 5A, 5B, and 5C illustrates different full-duplex use cases within a wireless communication network.
Figure 5B:
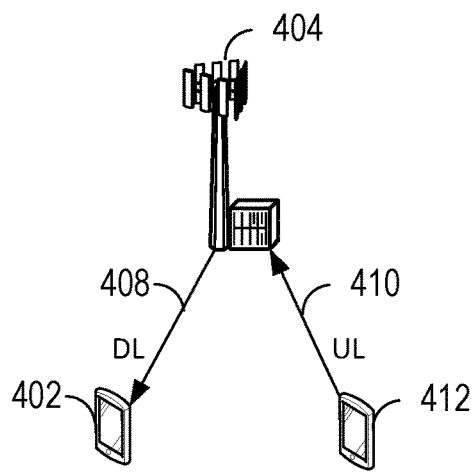
Figure 5C:
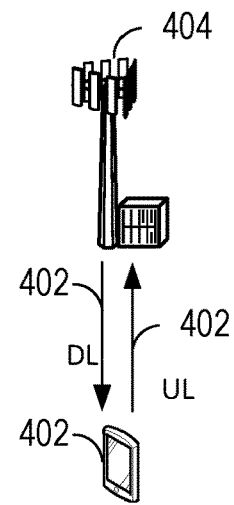

FIGS. 5A-5C illustrates different FD use cases within a wireless communication network, such as the wireless communication network 100. For example, FIG. 5A illustrates a first FD use case involving transmission between one UE 502 and two base stations (or multiple transmission reception points (mTRP)), BS 504 and BS 506. In some cases, UE 502 may be representative of UE 104 of FIG. 1 and BSs 504, 506 may be representative of BS 102 of FIG. 1. As shown, the UE 502 may simultaneously receive DL transmissions 508 from the BS 504 and transmit UL transmissions 510 to the BS 506. In some cases, the DL transmissions 508 and UL transmissions 510 may be performed using different antenna panels to facilitate the simultaneous transmission and reception.

A second FD use case is illustrated in FIG. 5B involving two different UEs and one BS. As illustrated, the UE 502 may receive DL transmissions 508 from the BS 504 while another UE 512 may simultaneously transmit UL transmission 510 to the BS 504. Thus, in this example, BS 504 is conducting simultaneous uplink and downlink communications.

A third FD use case is illustrated in FIG. 5C involving one BS and one UE. As illustrated, the UE 502 may receive DL transmissions 508 from the BS 504 and may simultaneously transmit UL transmissions 510 to the BS 504. As noted above, such simultaneous reception/transmission by the UE 502 may be facilitated by different antenna panels.

Table 1, below, illustrates various example scenarios in which each of the FD use cases may be used.

TABLE 1

| Base Station | UE | FD use case |
| --- | --- | --- |
| FD disabled | FD disabled | Baseline R-15/16 5G behavior |
| FD disabled | FD enabled | Use case #1 (FIG. 5A) for mTRP |
| FD enabled | FD disabled | Use case #2 (FIG. 5B) + R-16 IAB |
| FD enabled | FD enabled | Use case #3 (FIG. 5C) |

As shown in Table 1, if FD capability is disabled at both the base station and UE, the baseline R-15 and R-16 5G behavior may be used (e.g., HD communication). If FD capability is disabled at the BS but enabled at the UE, the UE may operate according to the first example FD use case shown in FIG. 5A in which the UE may communicate with two different TRPs simultaneously (e.g., simultaneous UL and DL transmissions) using two different antenna panels. If FD is enabled at the BS but disabled at the UE (e.g., the UE is not capable of FD), the BS may operate according to the second example FD use case shown in FIG. 5B in which the BS may communicate with two different UEs simultaneously (e.g., simultaneous UL and DL transmissions) using two different antenna panels. Finally, if FD is enabled at both the BS and the UE, the BS and UE may operate according to the third example FD use case shown in FIG. 5C in which the BS and UE may communicate with each other simultaneously on the UL and DL, each of the BS and UE using different antenna panels for UL and DL transmissions.

FIG. 6A, FIG. 6B, FIG. 6C, and FIG. 6D illustrate example CLI scenarios for various FD communication use cases.

Figure 6A:
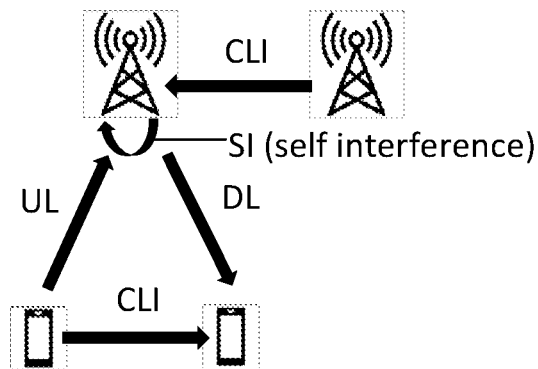
FIG. 6A, FIG. 6B, FIG. 6C, and FIG. 6D depict different interference scenarios occurring during full duplex (FD) communications.

As illustrated in FIG. 6A, a first CLI scenario may occur when FD is enabled for a gNB but disabled for each connected UE (which in turn may be enabled for half-duplex (HD) communication). The gNB may communicate using FD capabilities according to Use Case 2 of FIG. 5B. In this case, interference may include CLI between UEs, SI from the FD gNB, and CLI between the gNB and neighboring gNBs.

Figure 6B:
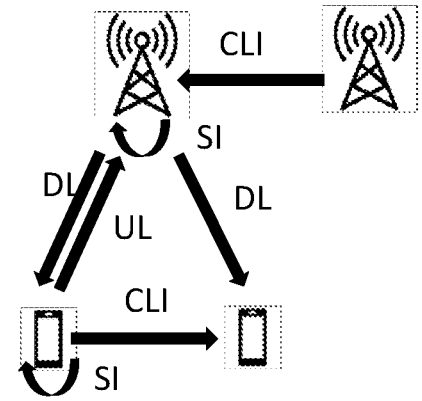

As illustrated in FIG. 6B, a second CLI scenario may occur when FD is enabled for both a gNB and an FD UE/customer premise equipment (CPE) connected to the gNB. The gNB may communicate with the FD UE using FD capabilities according to Use Case 3 of FIG. 5C. If the gNB is connected to a HD UE alongside the FD UE, the gNB communicates with the HD UE according to Use Case 2 of FIG. 5B. In this case, interference may include CLI between UEs, SI from the gNB and the FD UE, and CLI between the FD gNB and neighboring gNBs.

Figure 6C:
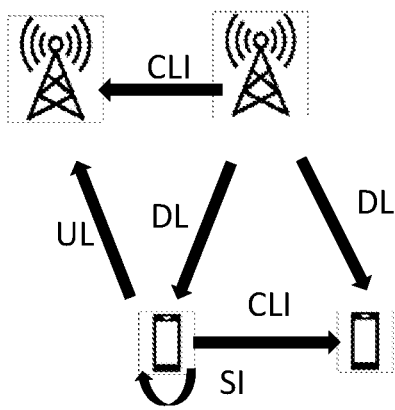

As illustrated in FIG. 6C, a third CLI scenario may occur when FD is disabled for two gNBs (e.g., in a multiple TRP scenario) and enabled at one UE/CPE connected to the two gNBs. The two gNBs may communicate with the FD UE using FD capabilities according to Use Case 1 of FIG. 5A. If one of the two gNBs is connected to a HD UE alongside the FD UE, the one gNB communicates with both the HD UE and the FD UE. In this case, interference may include CLI between UEs, SI from the FD UE, and CLI between the two gNBs.

Figure 6D:
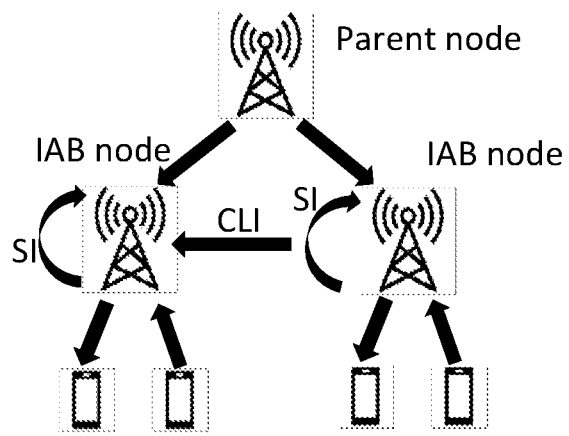

As illustrated in FIG. 6D, a fourth CLI scenario may occur when two FD IAB nodes have conditional enhanced duplexing capability. In the illustrated example, each of the two IAB nodes are connected to a parent node. Each IAB node may be enabled for FD communication and may communicate with at least two UEs according to Use Case 2 of FIG. 5B. In some cases, nodes involved in the FD use case depicted in FIG. 6D may support same frequency full duplex (SFFD) and frequency division multiplexing (FDM)/spatial division multiplexing (SDM) with resource block group (RBG) granularity. In this case, interference may include CLI between IAB nodes and SI from each IAB node.

As noted above, FD communication may be facilitated through the use of FDM or SDM. In FDM, the simultaneous UL and DL transmissions may be transmitted in the same time resources, but on separate frequency bands separated by some guard band. In SDM, the simultaneous UL and DL transmissions may transmitted on the same time and frequency resources but spatially separated into different, directional transmission beams. Such FD communication contrasts with HD communication that uses time division multiplexing (TDM), in order to schedule UL and DL transmissions on the same or different frequency resources, but at different times.

Aspects Related to Collision Avoidance for
Multiple Victims and/or Aggressors

Aspects of the present disclosure provide techniques for coordinating FD communications among multiple network entities by adjusting a configuration of measurement reference signals (RSs). The various techniques presented herein may allow for inter-gNB interference management and could help optimize FD and TDD communication sessions.

As noted above, remote interference measurement (RIM) frameworks may be deployed to help mitigate inter-gNB interference that occurs as a result of atmosphere ducting effects. Atmospheric ducting occurs in lower layers of Earth's atmosphere, where waves are bent by atmospheric refraction resulting from particular weather conditions (e.g., inversion). Atmospheric refraction causes electromagnetic waves like those deployed in a wireless system to travel over far greater distances than the distances configured for deployment under normal weather conditions. As a result, signaling from a network entity subject to ducting effect may travel father than anticipated, and may interfere with other network entities along its extended path.

Figure 7:
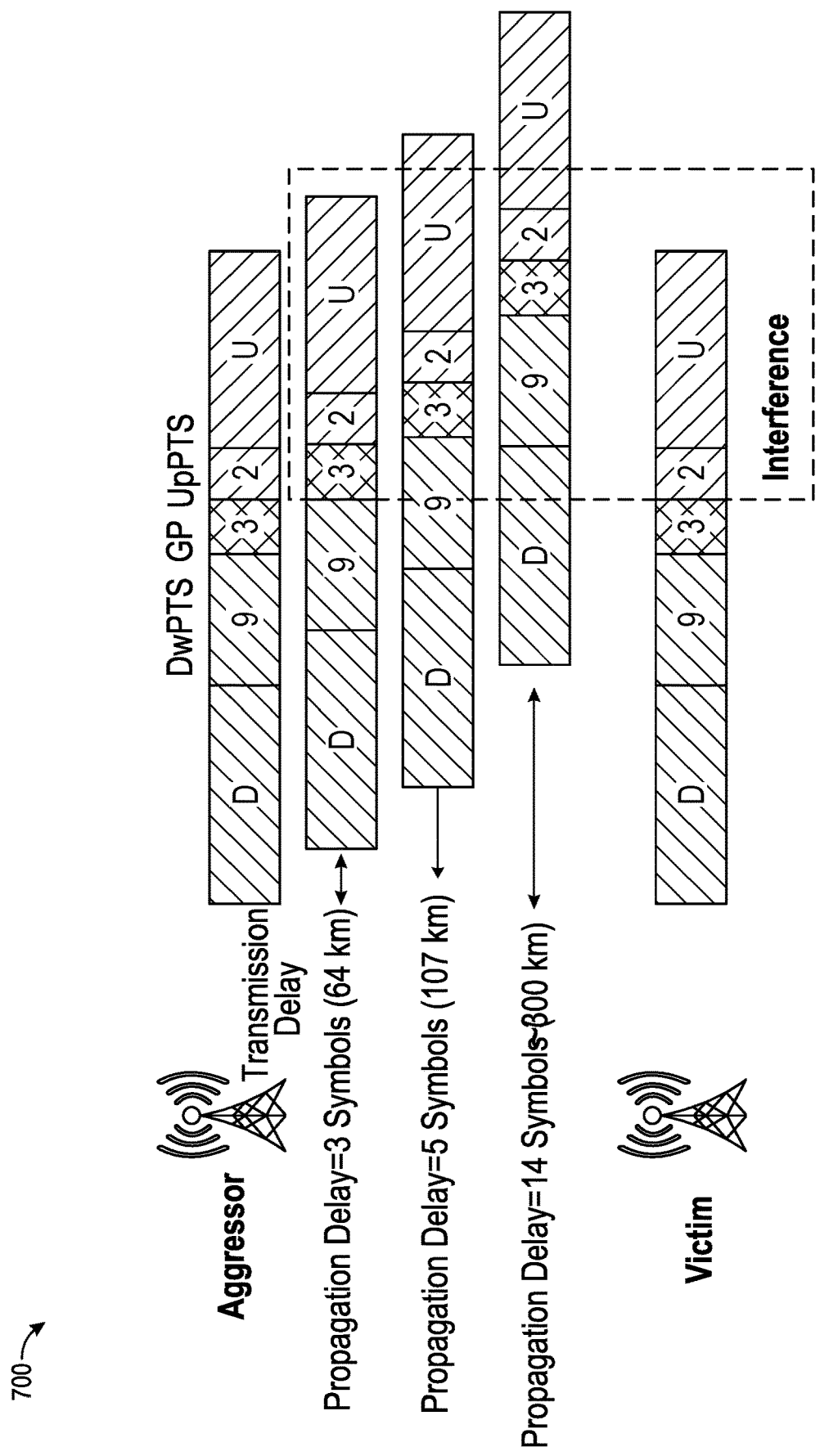
FIG. 7 depicts example an example of interference between an aggressor network entity and a victim network entity.

FIG. 7 illustrates inter-gNB interference that may occur in various FD deployment scenarios, including deployment scenarios affected and unaffected by ducting. An aggressor gNB may have downlink transmissions "D" scheduled in coordination with downlink transmission of a victim gNB, as illustrated in the first and last rows of FIG. 7. Coordination may be enabled using a transmission delay at the aggressor gNB, allowing alignment of aggressor and victim transmissions to mitigate interference. However, propagation delays (e.g., 3 symbol, 5 symbol, or 14 symbol delays) can cause the aggressor transmission to arrive later in time, as illustrated in rows 2 through 4 of FIG. 7. As a result, downlink transmissions by the aggressor gNB cause interference with uplink transmissions "U" of the victim gNB. Interference may cause signaling failure and wasted resources.

Conventionally, RIM frameworks only optimize a selected gNB beam to mitigate inter-gNB interference during FD communication when a ducting effect is present. Such RIM frameworks typically provide a single RS to mitigate beam interference due to the ducting effect, but do not provide per-beam RSs. As noted above, the procedure may limited for RIM in some cases (e.g., deactivated in absence of ducting effect).

Aspects of the present disclosure provide enhanced inter-gNB interference measurements that may help enable per-beam optimization to mitigate inter-gNB interference during FD communication in an expanded range of deployment scenarios (e.g., non-ducting scenarios). For example, the techniques described herein may help coordinate the configuration of measurement RSs sent from an aggressor network entity (e.g., a transmitting gNB) to a victim network entity (e.g., a receiving gNB) to measure actual inter-gNB interference. In some aspects, there may be multiple measurement RSs associated with multiple transmitting/receiving gNB beam pairs between the aggressor network entity and the victim network entity.

The techniques described herein may help coordinate configuration of measurement RS for "n×n" mutual measurements between multiple transmitting network entities to multiple receiving network entity for interference measurement. Such coordination may allow avoid collisions, for example of reception of measurement RS transmissions from gNBs neighboring one gNB with that gNB's own measurement RS transmissions. The coordination may also allow measurement RSs to be received and measured by multiple neighbor gNBs on the same resource to reduce signaling overhead. Implementation may also allow a gNB to receive and monitor (listen to) a set of measurement RSs from multiple neighbor aggressor gNBs operating in a time division multiplexed (TDM), code-division multiplexed (CDM), and/or frequency division multiplexed (FDM) mode.

Figure 8:
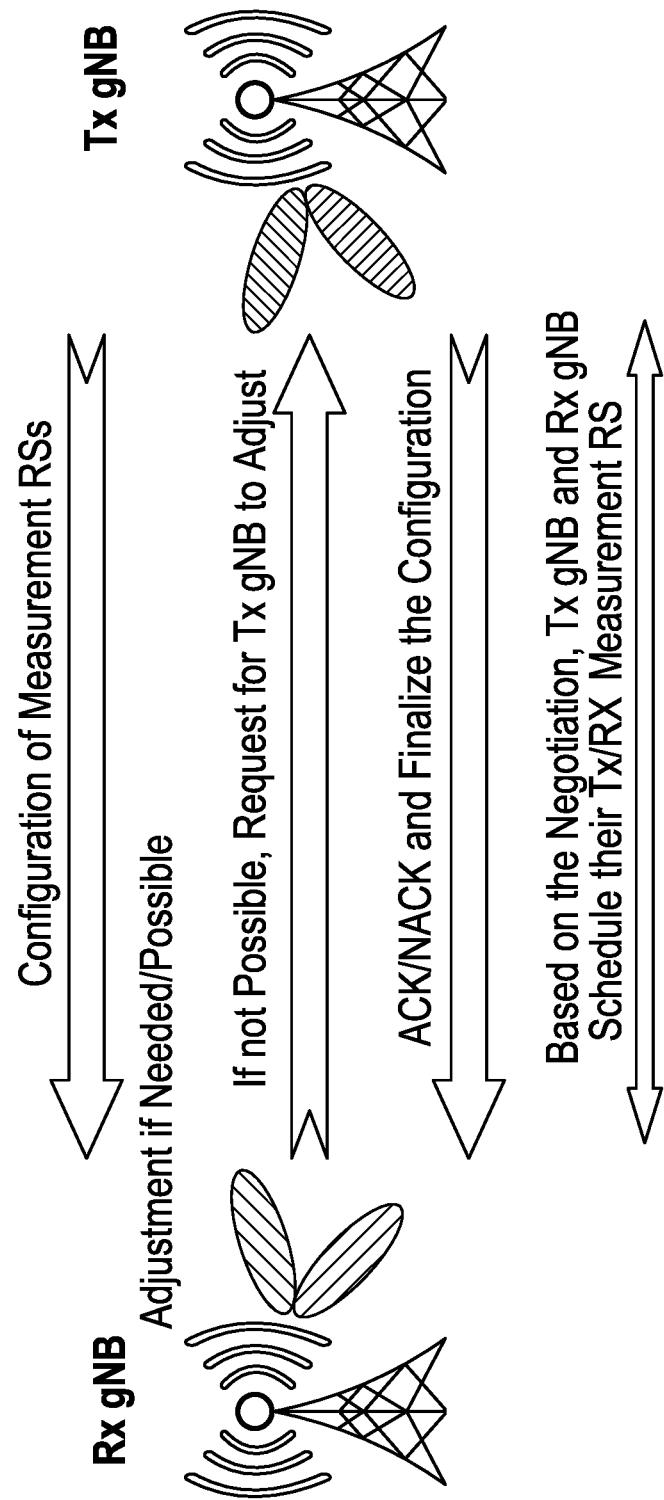
FIG. 8 depicts example signaling for reference signal (RS) collision avoidance between a receiving gNB and a transmitting gNB.

The call flow diagram 800 of FIG. 8 illustrates how RS measurement configurations for multiple transmitting (Tx) and receiving (Rx) gNBs may be coordinated.

In the illustrated example, a Tx gNB begins by sending an indication of its configuration of measurement RS to a Rx gNB. Based on this information (regarding the RS measurement configuration for the Tx gNB), the Rx gNB may adjust its own configuration, if possible, to avoid collision. For example, if possible, the Rx gNB may adjust when its measurement RS transmissions occur and/or what spatial resources (e.g., beams) are used for such transmission.

If the Rx gNB is not able to adjust its configuration to avoid collision, the Rx gNB may send a request for the Tx gNB to adjust its configuration. As illustrated, in such cases, the Tx gNB may send an acknowledgment (ACK/NACK) to the Rx gNB (indicating whether the request is accepted or not). Based on the acknowledgment, the Rx gNB may finalize its measurement RS configuration. The Tx gNB and Rx gNB may schedule their transmission and reception of measurement RS, based on the negotiation.

Figure 9:
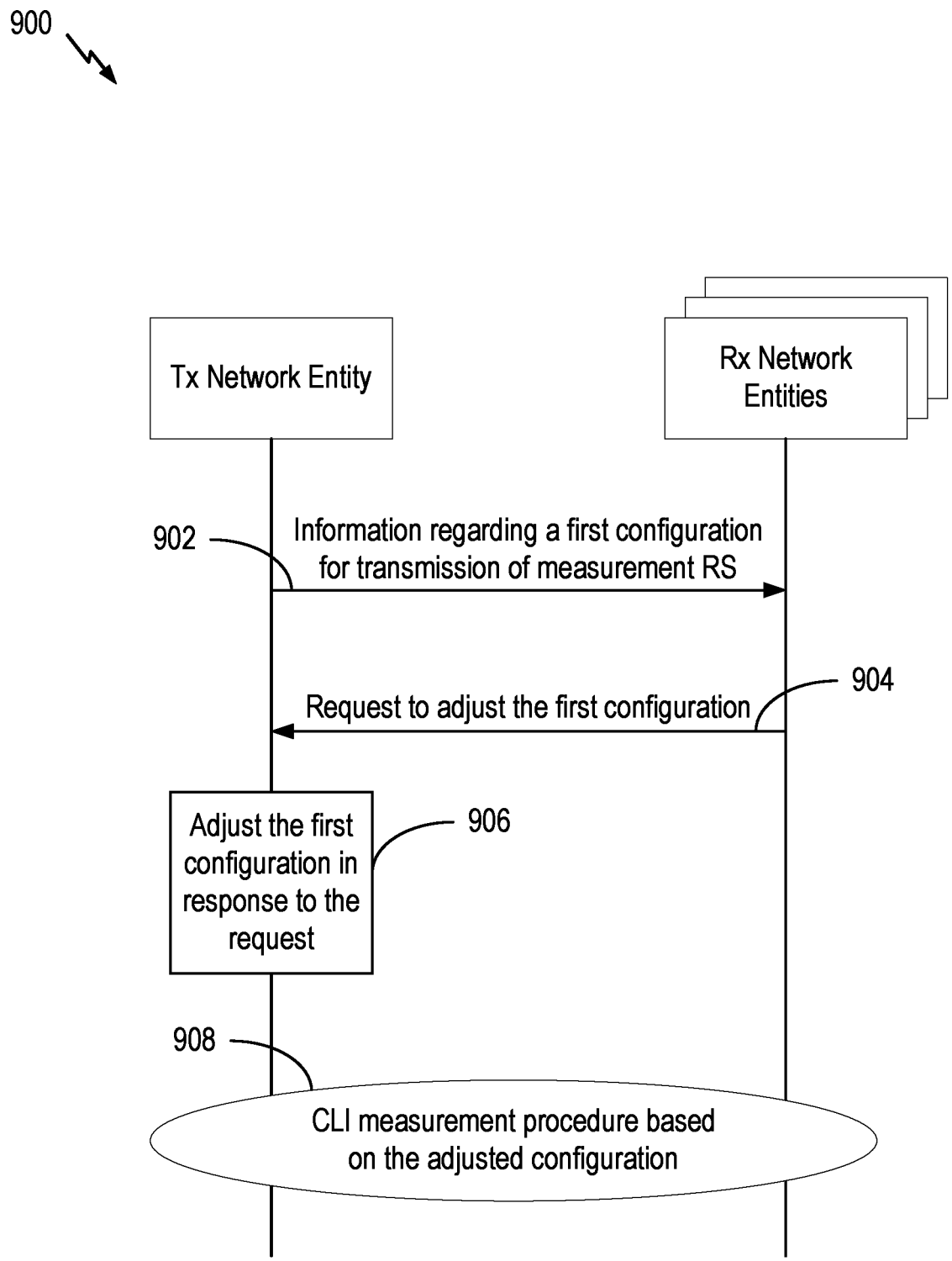
FIG. 9 depicts an example a call flow diagram for communications in a network between a transmitting network entity and one or more receiving network entities.
Figure 10:
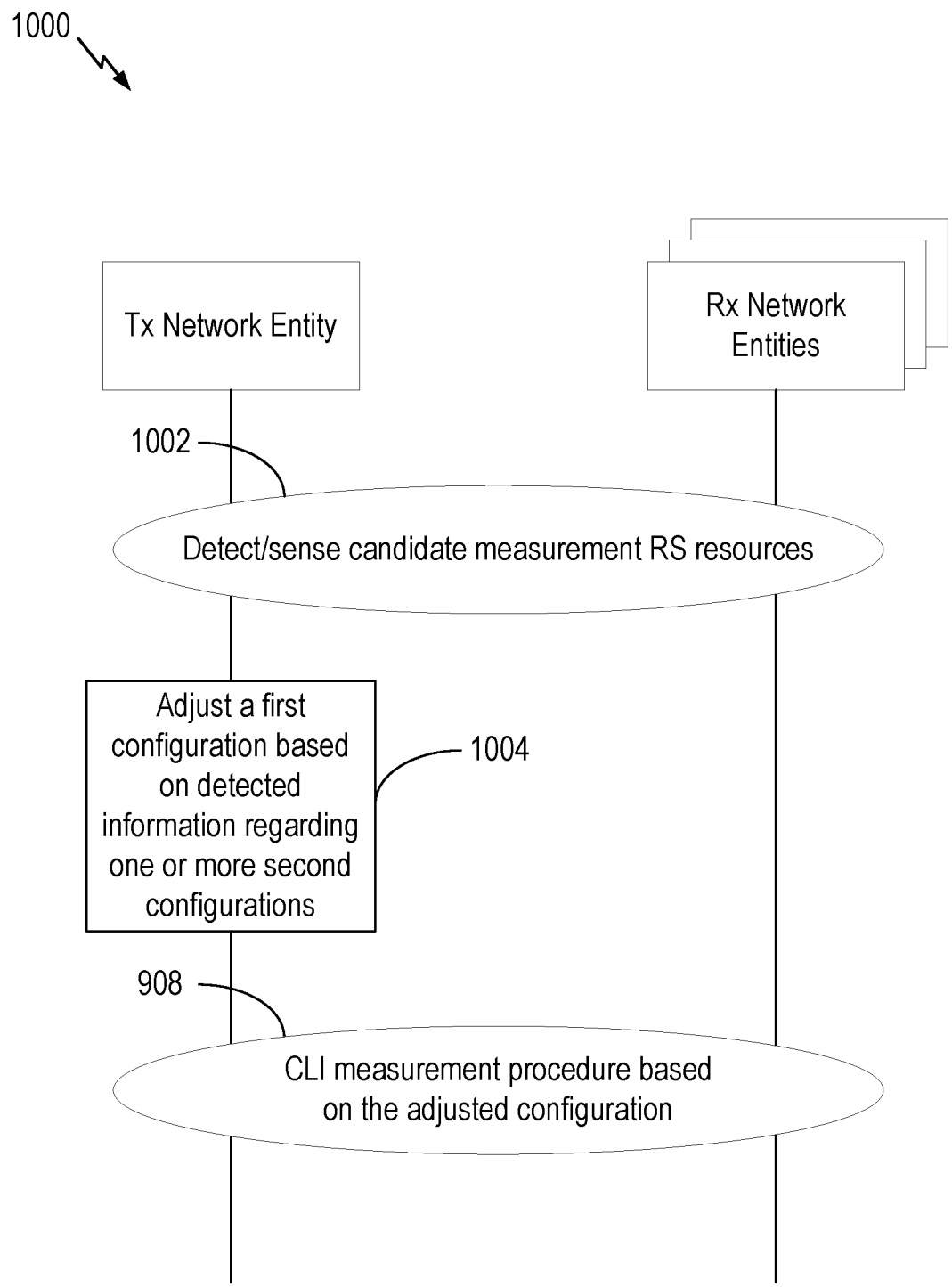
FIG. 10 depicts a call flow diagram for communications in a network between a transmitting network entity and one or more receiving network entities.

FIGS. 9 and 10 illustrate call flow diagrams (900 and 1000) for how information regarding a measurement RS configuration may be signaled explicitly (FIG. 9) or may be sensed (FIG. 10).

The Tx and Rx network entities may be examples of the BS 102 depicted and described with respect to FIGS. 1 and 3. In some cases, the Tx and Rx network entities may be an example of the CU 210, the DU 230, and/or the RU 240 depicted and described with respect to FIG. 2. However, the Tx and Rx network entities may be another type of network entity or network node, such as those described herein.

Referring first to the call flow diagram 900 of FIG. 9, at 902, the Tx network entity sends information regarding a first configuration for transmission of measurement RS to one or more receiving network entities. For example, the information may include information regarding configured measurement RS periodicity, measurement RS patterns, and/or configured measurement RS resources.

As noted above, in some cases, an Rx network entity (e.g., Rx gNB) may adjust its own measurement RS configuration, based on the information it receives from the Tx network entity (e.g., Tx gNB) in order to avoid collisions. In some cases, the Rx network entity may not be able to change its configuration and may need to ask the Tx network entity to modify its configuration.

For example, at 904, one of the Rx network entities may send a request for the Tx network entity to adjust its configuration. In the illustrated example, at 906, the Tx network entity adjusts its configuration in response to the request. In some cases, the Tx network entity may send an acknowledgment (ACK) of the request, confirming it is able to adjust its configuration (and possibly indicating/confirming the adjusted configuration).

At 908, the Tx and Rx network entities perform the CLI measurement procedure, based on the adjusted configuration(s). In some cases, the CLI measurement procedure comprises scheduled measurement RS transmissions, in accordance with the first configuration and corresponding measurement RS reception and reporting. In some cases, a Tx network entity may adjust the first configuration according to action performed by a CU (e.g., the CU 210 of FIG. 2).

As noted above, if other network entities (e.g. one or more Rx gNBs) do not have a collision, or if one or more receiving network entities cannot adjust to avoid a collision, the one or more receiving network entities may signal their own info and request that the transmitting network entity adjust the measurement RS configuration.

Based on the negotiation and coordination between the transmitting network entity and the one or more receiving network entities discussed above, the network entities may finalize their own configuration of measurement RS and transmit, receive, and measure based on the configuration.

As noted above, transmitting and receiving network entities (e.g., gNBs) may be an example of the BS 102 depicted and described with respect to FIGS. 1 and 3. In some cases, the transmitting and receiving network entities may be examples of the CU 210, the DU 230, and/or the RU 240 depicted and described with respect to the disaggregated network of FIG. 2. In such cases, a CU may obtain configuration information from its DU(s) via a backhaul interface and adjust one or more of the configurations accordingly.

In one case, a CU may determine a first configuration for transmission of measurement RSs from Tx network entity, based on information regarding one or more second configurations for transmission of measurement RS from one or more Rx network entities. The CU may then transmit information regarding the first configuration to the first network entity.

If the gNBs/DUs participating in the negotiation and coordination belong to the same CU, the network may require DU-CU F1 signaling for negotiation and coordination. In some cases, the CU may make certain decisions on behalf of the transmitting and/or receiving network entities. In one example, a CU may coordinate measurement RS configurations for multiple entities in order to avoid collision and reuse measurement RSs of a Tx gNB as measured by multiple Rx gNBs. In such cases, the CU may coordinate at least one of a measurement RS periodicity, measurement RS pattern, and/or measurement RS resources to avoid collisions or allow for multiple entities to perform measurement at the same time.

If the gNBs/DUs belong to different CUs, the network may utilize signaling between CUs (e.g., CU-CU Xn signaling) for negotiation and coordination. Based on coordination by the involved CUs, the CUs may make certain decisions on behalf of the transmitting and/or receiving network entities. In one example, the CUs may negotiate and determine how to avoid collision and reuse measurement RSs of a Tx gNB as measured by multiple Rx gNBs.

According to certain aspects, negotiation and coordination may be performed via backhaul signaling and/or over-the-air (OTA) signaling.

As shown in the call flow diagram 1000 of FIG. 10, CLI coordination and negotiation may be based on mutual detectability and sensing of measurement RS resource of multiple network entities. In this option, there may be preconfigured multiple candidate resource locations and/or windows to transmit measurement RSs by different network entities. In certain cases, there may be preconfigured multiple candidate resource locations to transmit measurement RSs by different network entities.

Before each network entity transmits its own measurement RSs, at 1002, they may first perform sensing operations. For example, a gNB may observe whether recent candidate resource locations are occupied. This may allow a sensing gNB to select certain possibly unoccupied candidate resource locations to transmit measurement RSs. As a result, the sensing gNB may better avoid collision with other nearby neighbor gNBs, thus mitigating interference and resultant waste.

After detecting/sensing candidate measurement RS resources, the network entities may proceed in a similar manner as described above with reference to FIG. 9.

For example, at 1004, the Tx network entity may adjust its own RS configuration based on detected information regarding one or more second configurations. At 1008, the Tx and Rx network entities perform the CLI measurement procedure, based on the (sensed/detected) adjusted measurement RS configuration(s).

In some cases, one or more rules (e.g., specified in a standard) may define a sensing time duration, periodicity, and/or offset. Each network entity may follow such rules to determine when to start transmitting its measurement RS.

Similarly, one or more rules (e.g., specified in a standard) may define certain periodic or aperiodic time windows for reception of measurement RS. For example, when a gNB (or other network entity) joins a network, that gNB may be allocated a certain time window to receive and measure a set of measurement RSs transmitted from other neighbor gNBs for inter-gNB interference measurement.

In some cases, while sensing/detecting candidate measurement RSs, a network entity may listen to several frames while maintaining periodicity. This sensing period may be similar to a vehicle to everything (V2X) information exchange. After the sensing period ends, the network entity may update measurement RSs or repeat the sensing procedure.

In some cases, a network entity may request reconfiguration of receiving measurement windows. In some cases, if environmental changes occur or a number of network entities change, a gNB may adjust periodicity. For example, if a number of gNBs are added to the network, a request may be made to reconfigure Rx measurement windows to reduce periodicity to maintain a same overhead (as before the gNBs were added).

Using the techniques described herein, interference measurement RS configurations may be negotiated such that reception periods of measurement RSs of neighboring network entities will not collide with transmission periods from those same entities. In some cases, the negotiations may attempt to avoid a network entity receive multiple colliding measurement RSs transmitted from other network entities.

Aspects of the present disclosure provide techniques for negotiation and coordination between network entities to avoid collision that causes wasteful interference during FD communication. Aspects may be applied in a network as depicted in FIG. 1, or in a disaggregated network as depicted in FIG. 2. Implementation of techniques described herein may allow transmission of measurement RSs to be received and measured by multiple neighboring network entities at the same resource to reduce overhead. As a result, collisions may be reduced along with signal failure and excessive retransmission.

Example Operations of a Network Entity

Figure 11:
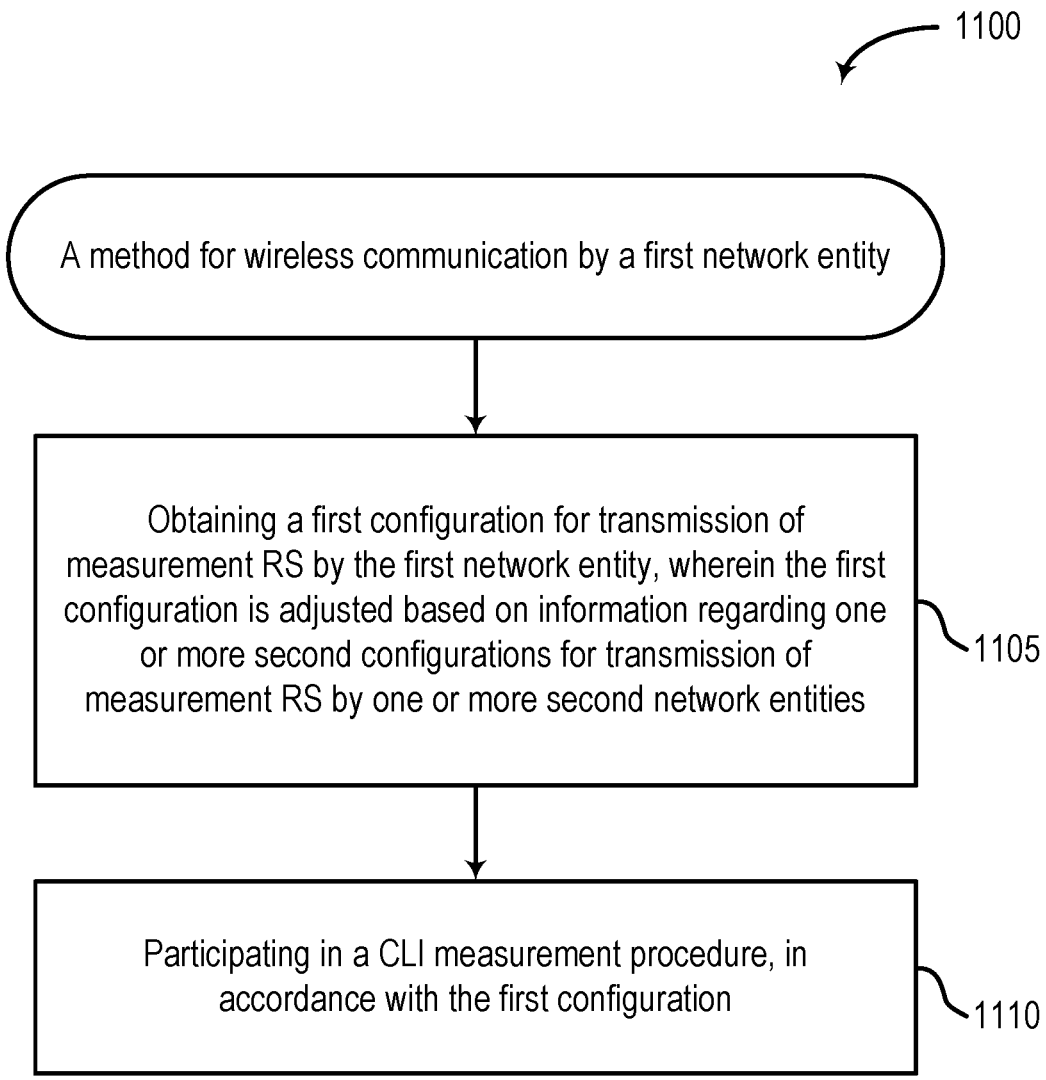
FIG. 11 depicts a method for wireless communications.

FIG. 11 shows a method 1100 for wireless communications by a first network entity, such as BS 102 of FIGS. 1 and 3, or a disaggregated base station as discussed with respect to FIG. 2.

Method 1100 begins at 1105 with obtaining a first configuration for transmission of measurement RS by the first network entity, wherein the first configuration is adjusted based on information regarding one or more second configurations for transmission of measurement RS by one or more second network entities. In some cases, the operations of this step refer to, or may be performed by, measurement RS configuration circuitry as described with reference to FIG. 14.

Method 1100 then proceeds to step 1110 with participating in a CLI measurement procedure, in accordance with the first configuration. In some cases, the operations of this step refer to, or may be performed by, CLI measurement procedure circuitry as described with reference to FIG. 14.

Various aspects relate to the method 1100, including the following aspects.

In some aspects, participating in the CLI measurement procedure comprises at least one of: scheduling measurement RS transmissions, in accordance with the first configuration; or scheduling measurement RS reception, in accordance with the first configuration.

In some aspects, the first configuration and the one or more second configurations indicate at least one of a measurement RS periodicity, measurement RS pattern, or measurement RS resources.

In some aspects, method 1100 further includes adjusting the first configuration, based on the information regarding the one or more second configurations, to avoid collision of measurement RS transmissions from the first network entity with RS transmissions from the one or more second network entities.

In some aspects, method 1100 further includes adjusting the first configuration, based on the information regarding the one or more second configurations, to enable measurement RS transmissions from the first network entity to be received by multiple of the one or more second network entities.

In some aspects, method 1100 further includes obtaining the information regarding the one or more second configurations from the one or more second network entities. In some aspects, method 1100 further includes transmitting information regarding the first configuration to one or more of the second network entities. In some aspects, method 1100 further includes receiving a request, from one or more of the second network entities, to adjust the first configuration. In some aspects, method 1100 further includes adjusting the first configuration in response to the request.

In some aspects, the first and second network entities comprise a first DU and a second DU. In some aspects, obtaining the first configuration involves signaling between the first DU and a CU via a backhaul interface, wherein the first DU belongs to the CU. In some aspects, the CU adjusts the first configuration based on the information regarding the one or more second configurations for transmission of measurement RS by one or more second network entities. In some aspects, if the first DU and the second DU belong to different CUs, obtaining the first configuration also involves signaling between the different CUs to obtain the information regarding the one or more second configurations for transmission of measurement RS by one or more second network entities.

In some aspects, method 1100 further includes obtaining the information regarding the one or more second configurations by monitoring candidate measurement RS resources. In some aspects, participating in the CLI measurement procedure comprises transmitting measurement RS on a candidate measurement RS resources after determining that candidate measurement RS resource is unoccupied by any of the one or more second network entities. In some aspects, the first network entity monitors candidate measurement resources within time windows allocated for CLI measurement. In some aspects, the time windows are defined by at least one of a sensing time duration, periodicity, or offset for transmission of measurement RS.

Figure 14:
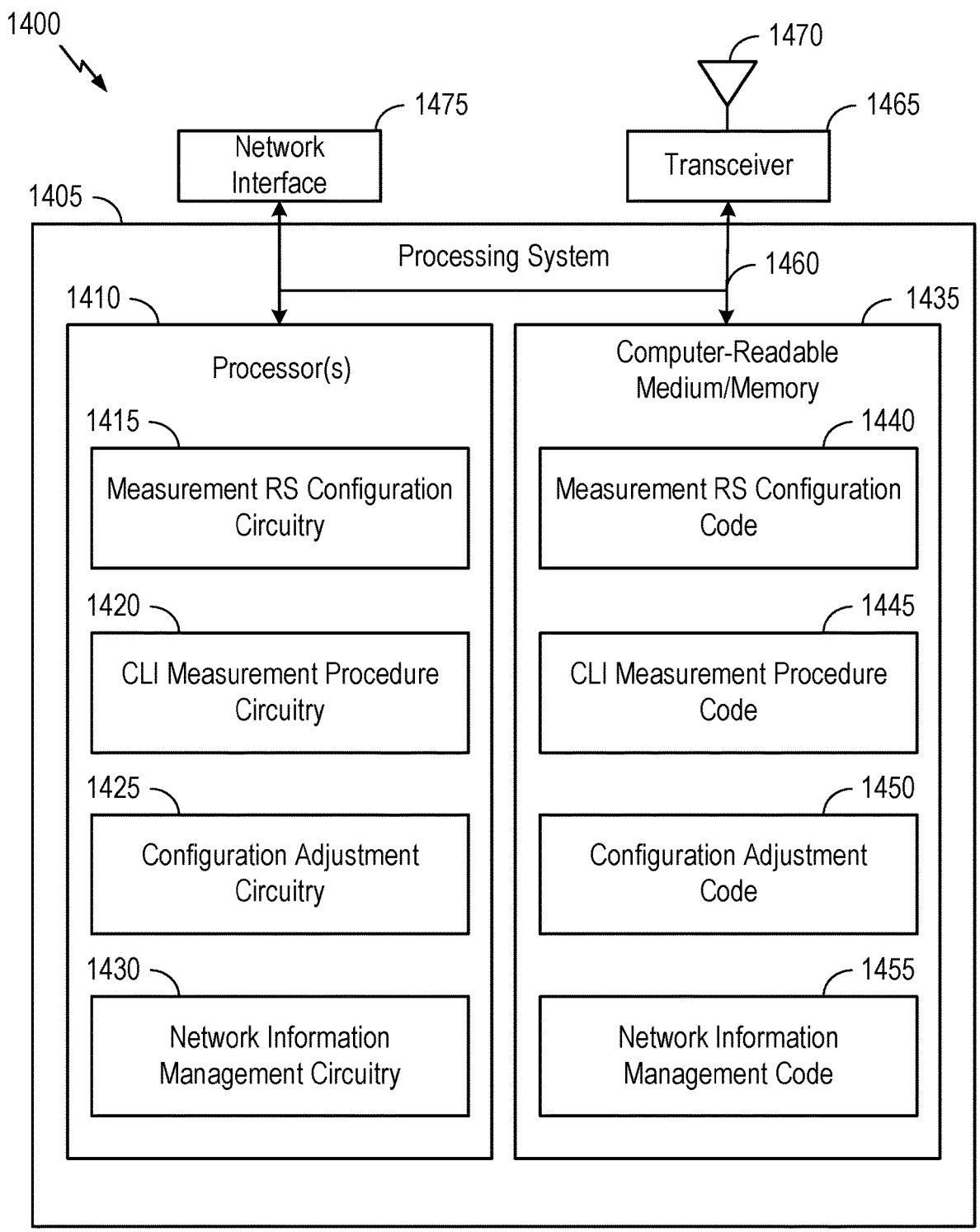
FIG. 14 depicts aspects of an example communications device.

In one aspect, method 1100, or any aspect related to it, may be performed by an apparatus, such as communications device 1400 of FIG. 14, which includes various components operable, configured, or adapted to perform the method 1100. Communications device 1400 is described below in further detail.

Note that FIG. 11 is just one example of a method, and other methods including fewer, additional, or alternative steps are possible consistent with this disclosure.

Figure 12:
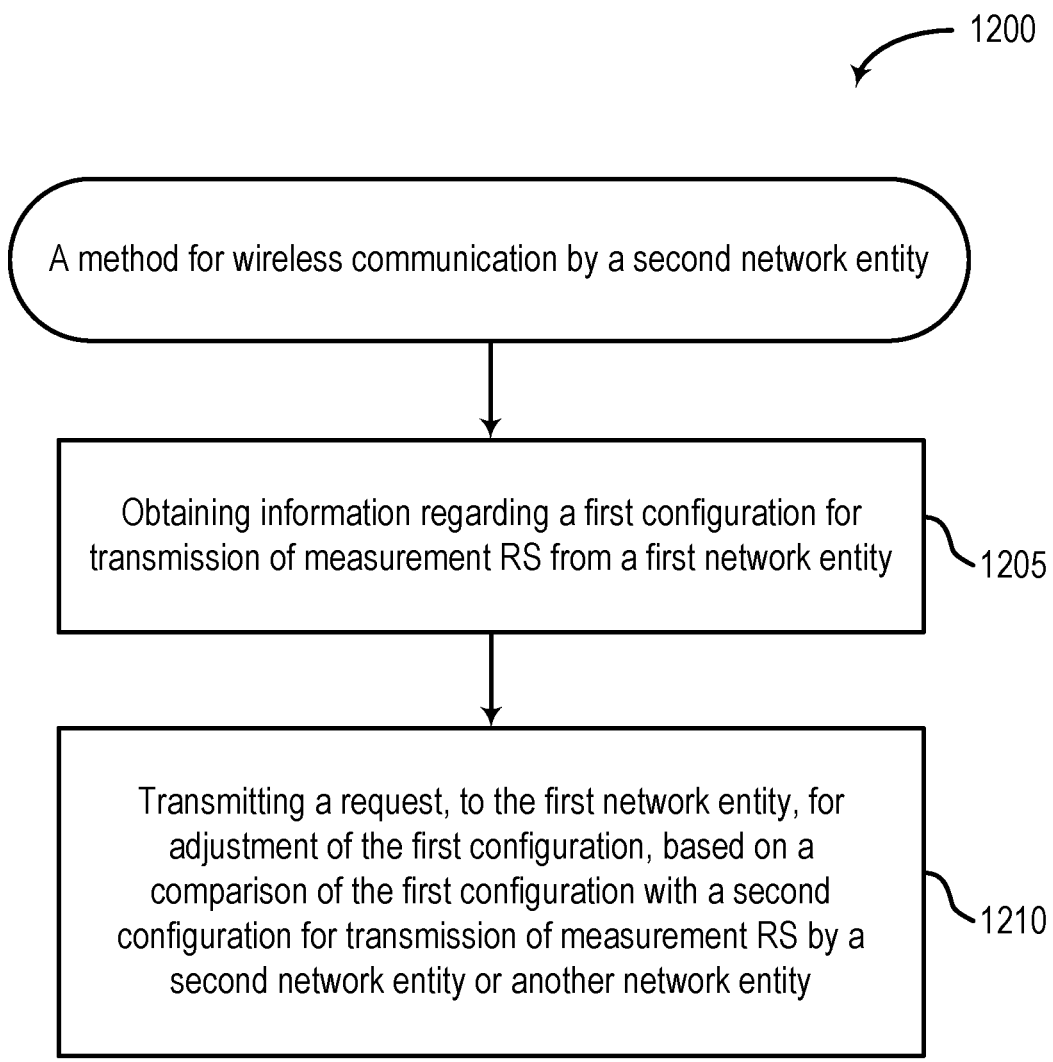
FIG. 12 depicts a method for wireless communications.

FIG. 12 shows a method 1200 for wireless communications by a second network entity, such as BS 102 of FIGS. 1 and 3, or a disaggregated base station as discussed with respect to FIG. 2.

Method 1200 begins at 1205 with obtaining information regarding a first configuration for transmission of measurement RS from a first network entity. In some cases, the operations of this step refer to, or may be performed by, configuration information circuitry as described with reference to FIG. 15.

Method 1200 then proceeds to step 1210 with transmitting a request, to the first network entity, for adjustment of the first configuration, based on a comparison of the first configuration with a second configuration for transmission of measurement RS by a second network entity or another network entity. In some cases, the operations of this step refer to, or may be performed by, configuration adjustment request circuitry as described with reference to FIG. 15.

Various aspects relate to the method 1200, including the following aspects.

In some aspects, the first configuration and the one or more second configurations indicate at least one of a measurement RS periodicity, measurement RS pattern, or measurement RS resources. In some aspects, the request is for adjustment of the first configuration to avoid collision of measurement RS transmissions from the first network entity with RS transmissions from the second network entity or the other network entity. In some aspects, method 1200 further includes obtaining the information regarding the first configuration from the first network entity.

In some aspects, the first and second network entities comprise a first DU and a second DU. In some aspects, obtaining the first configuration involves signaling between the first DU and a CU, wherein at least the second DU belongs to the CU. In some aspects, the CU adjusts the first configuration based on the information regarding the one or more second configurations for transmission of measurement RS by one or more second network entities. In some aspects, if the first DU and second DU belong to different CUs, obtaining the first configuration also involves signaling between the different CUs to obtain the information regarding the one or more second configurations for transmission of measurement RS by one or more second network entities.

In some aspects, obtaining the information regarding the first configuration comprises monitoring candidate measurement RS resources. In some aspects, the second network entity monitors candidate measurement resources within time windows allocated for CLI measurement. In some aspects, the time windows are defined by at least one of a sensing time duration, periodicity, or offset for transmission of measurement RS.

Figure 15:
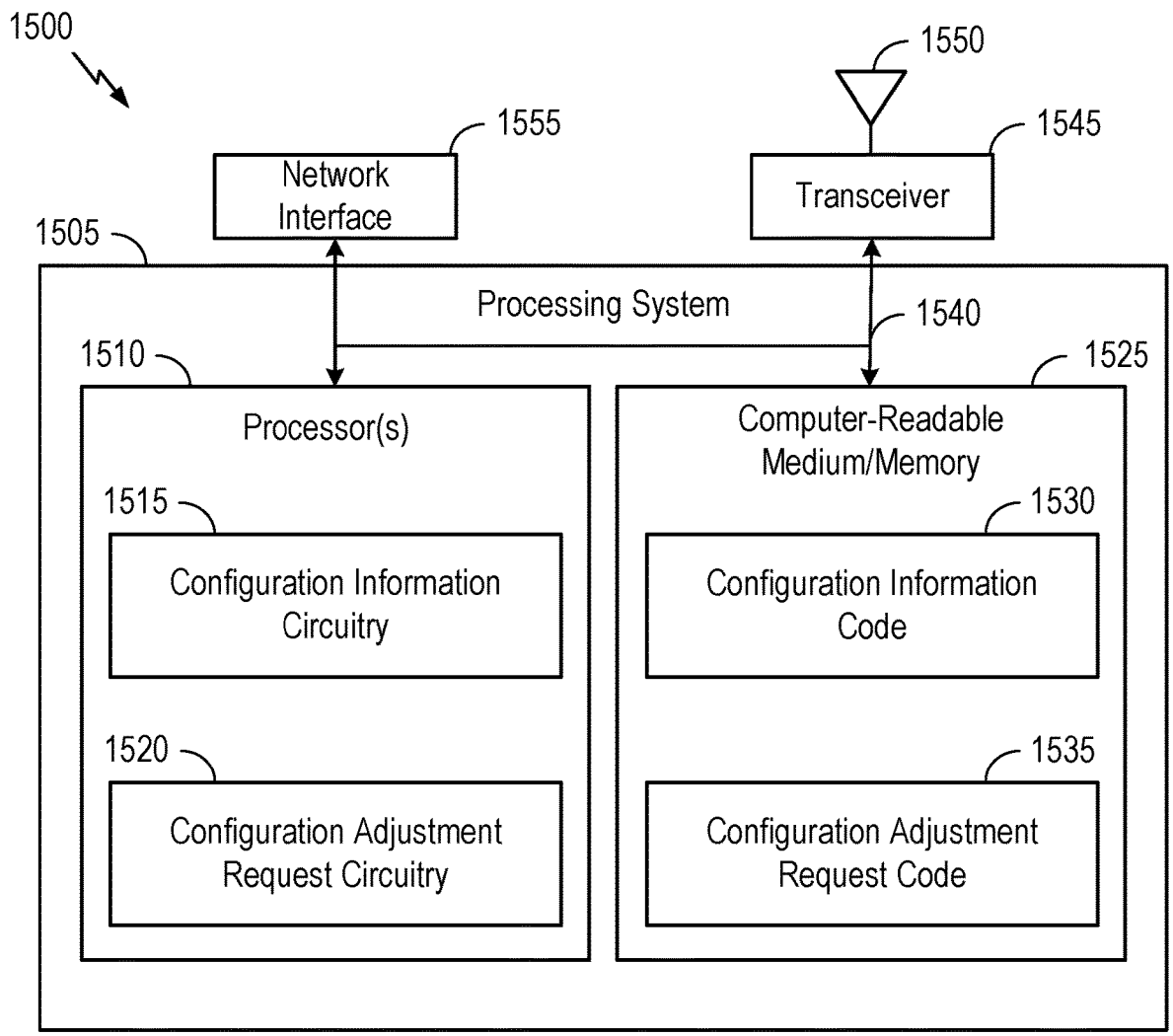
FIG. 15 depicts aspects of an example communications device.

In one aspect, method 1200, or any aspect related to it, may be performed by an apparatus, such as communications device 1500 of FIG. 15, which includes various components operable, configured, or adapted to perform the method 1200. Communications device 1500 is described below in further detail.

Note that FIG. 12 is just one example of a method, and other methods including fewer, additional, or alternative steps are possible consistent with this disclosure.

Example Operations of a Central Unit

Figure 13:
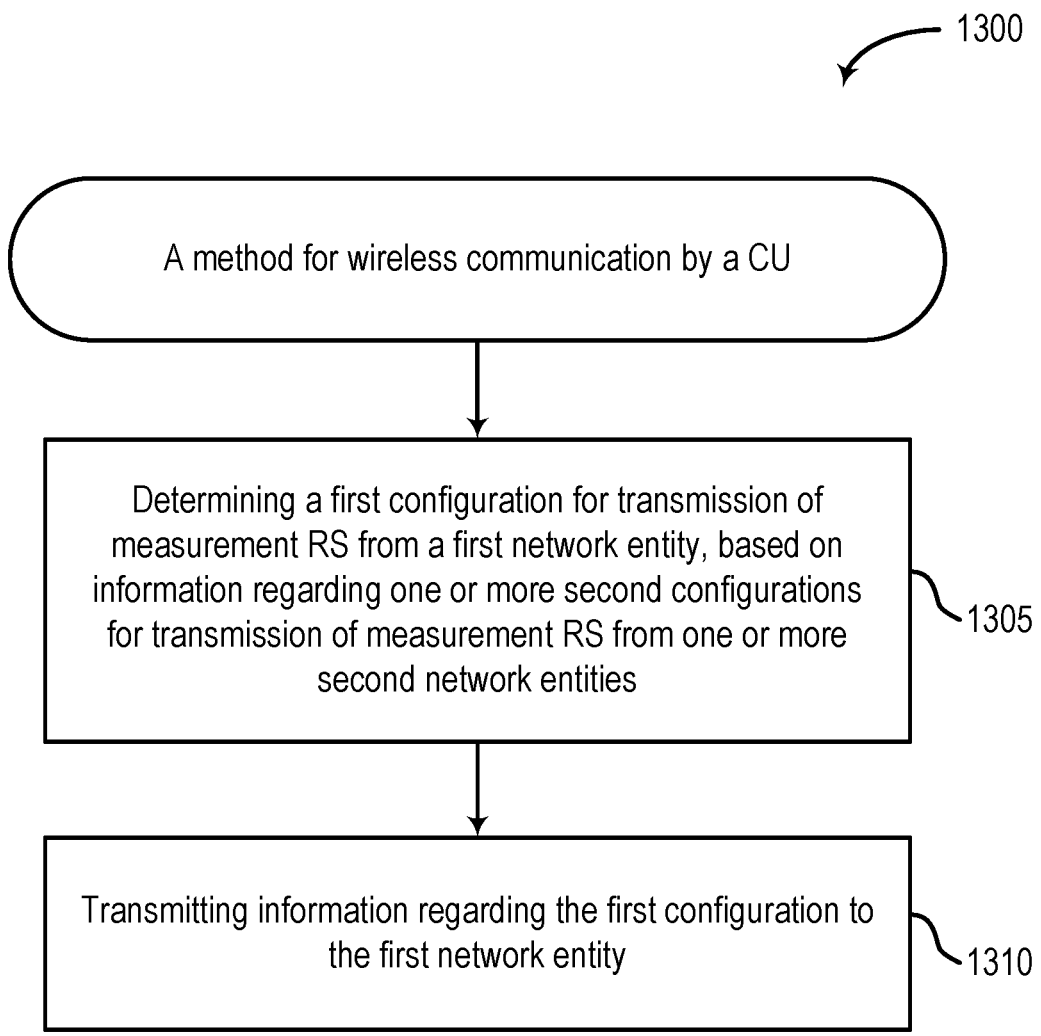
FIG. 13 depicts a method for wireless communications.

FIG. 13 shows a method 1300 for wireless communications by a CU, such as BS 102 of FIGS. 1 and 3, or a disaggregated base station as discussed with respect to FIG. 2.

Method 1300 begins at 1305 with determining a first configuration for transmission of measurement RS from a first network entity, based on information regarding one or more second configurations for transmission of measurement RS from one or more second network entities. In some cases, the operations of this step refer to, or may be performed by, network configuration determination circuitry as described with reference to FIG. 16.

Method 1300 then proceeds to step 1310 with transmitting information regarding the first configuration to the first network entity. In some cases, the operations of this step refer to, or may be performed by, network configuration indication circuitry as described with reference to FIG. 16.

Various aspects relate to the method 1300, including the following aspects.

In some aspects, method 1300 further includes transmitting information regarding the second configuration to the second network entity. In some aspects, the first configuration and the one or more second configurations indicate at least one of a measurement RS periodicity, measurement RS pattern, or measurement RS resources. In some aspects, determining the first configuration comprises adjusting the first configuration to avoid collision of measurement RS transmissions from the first network entity with RS transmissions from the one or more second network entities. In some aspects, determining the first configuration comprises adjusting the first configuration to enable measurement RS transmissions from the first network entity to be received by multiple of the one or more second network entities. In some aspects, the first and second network entities comprise first and second DU.

Figure 16:
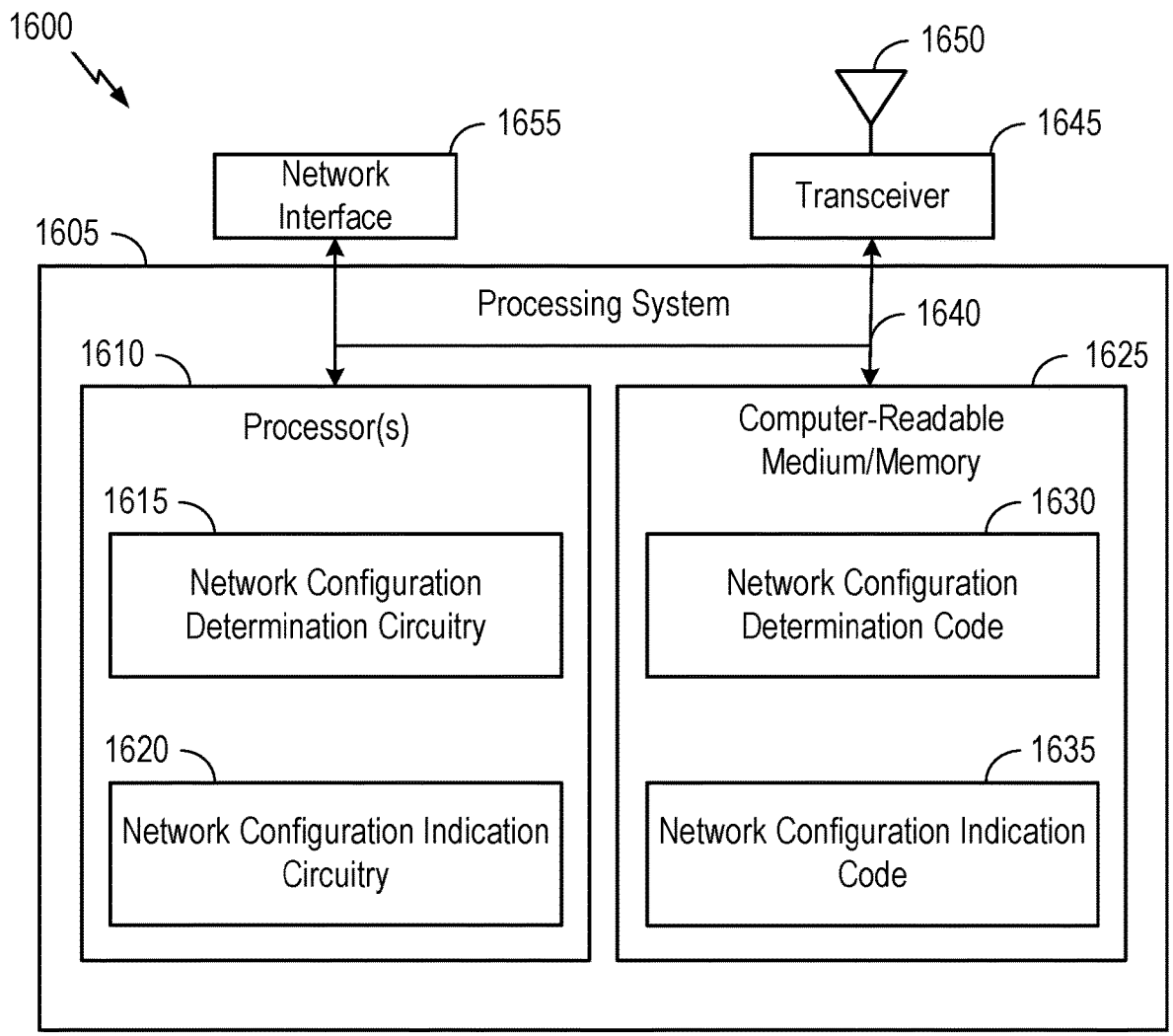
FIG. 16 depicts aspects of an example communications device.

In one aspect, method 1300, or any aspect related to it, may be performed by an apparatus, such as communications device 1600 of FIG. 16, which includes various components operable, configured, or adapted to perform the method 1300. Communications device 1600 is described below in further detail.

Note that FIG. 13 is just one example of a method, and other methods including fewer, additional, or alternative steps are possible consistent with this disclosure.

Example Communications Devices

FIG. 14 depicts aspects of an example communications device 1400. In some aspects, communications device 1400 is a first network entity, such as BS 102 described above with respect to FIGS. 1 and 3.

The communications device 1400 includes a processing system 1405 coupled to the transceiver 1465 (e.g., a transmitter and/or a receiver) and/or a network interface 1475. The transceiver 1465 is configured to transmit and receive signals for the communications device 1400 via the antenna 1470, such as the various signals as described herein. The network interface 1475 is configured to obtain and send signals for the communications device 1400 via communication link(s), such as a backhaul link, midhaul link, and/or fronthaul link as described herein, such as with respect to FIG. 2. The processing system 1405 may be configured to perform processing functions for the communications device 1400, including processing signals received and/or to be transmitted by the communications device 1400.

The processing system 1405 includes one or more processors 1410. In various aspects, one or more processors 1410 may be representative of one or more of receive processor 338, transmit processor 320, TX MIMO processor 330, and/or controller/processor 340, as described with respect to FIG. 3. The one or more processors 1410 are coupled to a computer-readable medium/memory 1435 via a bus 1460. In certain aspects, the computer-readable medium/memory 1435 is configured to store instructions (e.g., computer-executable code) that when executed by the one or more processors 1410, cause the one or more processors 1410 to perform the method 1100 described with respect to FIG. 11, or any aspect related to it. Note that reference to a processor of communications device 1400 performing a function may include one or more processors 1410 of communications device 1400 performing that function.

In the depicted example, the computer-readable medium/memory 1435 stores code (e.g., executable instructions), such as measurement RS configuration code 1440, CLI measurement procedure code 1445, configuration adjustment code 1450, and network information management code 1455. Processing of the measurement RS configuration code 1440, CLI measurement procedure code 1445, configuration adjustment code 1450, and network information management code 1455 may cause the communications device 1400 to perform the method 1100 described with respect to FIG. 11, or any aspect related to it.

The one or more processors 1410 include circuitry configured to implement (e.g., execute) the code stored in the computer-readable medium/memory 1435, including circuitry such as measurement RS configuration circuitry 1415, CLI measurement procedure circuitry 1420, configuration adjustment circuitry 1425, and network information management circuitry 1430. Processing with measurement RS configuration circuitry 1415, CLI measurement procedure circuitry 1420, configuration adjustment circuitry 1425, and network information management circuitry 1430 may cause the communications device 1400 to perform the method 1100 as described with respect to FIG. 11, or any aspect related to it.

Various components of the communications device 1400 may provide means for performing the method 1100 as described with respect to FIG. 11, or any aspect related to it. Means for transmitting, sending or outputting for transmission may include transceivers 332 and/or antenna(s) 334 of the BS 102 illustrated in FIG. 3 and/or the transceiver 1465 and the antenna 1470 of the communications device 1400 in FIG. 14. Means for receiving or obtaining may include transceivers 332 and/or antenna(s) 334 of the BS 102 illustrated in FIG. 3 and/or the transceiver 1465 and the antenna 1470 of the communications device 1400 in FIG. 14.

According to some aspects, measurement RS configuration circuitry 1415 obtains a first configuration for transmission of measurement RS by the first network entity, wherein the first configuration is adjusted based on information regarding one or more second configurations for transmission of measurement RS by one or more second network entities.

According to some aspects, CLI measurement procedure circuitry 1420 participates in a CLI measurement procedure, in accordance with the first configuration. In some aspects, participating in the CLI measurement procedure comprises at least one of: scheduling measurement RS transmissions, in accordance with the first configuration; or scheduling measurement RS reception, in accordance with the first configuration. In some aspects, the first configuration and the one or more second configurations indicate at least one of a measurement RS periodicity, measurement RS pattern, or measurement RS resources.

According to some aspects, configuration adjustment circuitry 1425 adjusts the first configuration, based on the information regarding the one or more second configurations, to avoid collision of measurement RS transmissions from the first network entity with RS transmissions from the one or more second network entities. In some examples, configuration adjustment circuitry 1425 adjusts the first configuration, based on the information regarding the one or more second configurations, to enable measurement RS transmissions from the first network entity to be received by multiple of the one or more second network entities.

According to some aspects, network information management circuitry 1430 obtains the information regarding the one or more second configurations from the one or more second network entities. In some examples, network information management circuitry 1430 transmits information regarding the first configuration to one or more of the second network entities.

In some examples, configuration adjustment circuitry 1425 receives a request, from one or more of the second network entities, to adjust the first configuration. In some examples, configuration adjustment circuitry 1425 adjusts the first configuration in response to the request.

In some aspects, the first and second network entities comprise a first DU and a second DU. In some aspects, obtaining the first configuration involves signaling between the first DU and a CU via a backhaul interface, wherein the first DU belongs to the CU. In some aspects, the CU adjusts the first configuration based on the information regarding the one or more second configurations for transmission of measurement RS by one or more second network entities. In some aspects, if the first DU and the second DU belong to different CUs, obtaining the first configuration also involves signaling between the different CUs to obtain the information regarding the one or more second configurations for transmission of measurement RS by one or more second network entities.

In some examples, network information management circuitry 1430 obtains the information regarding the one or more second configurations by monitoring candidate measurement RS resources. In some aspects, participating in the CLI measurement procedure comprises transmitting measurement RS on a candidate measurement RS resources after determining that candidate measurement RS resource is unoccupied by any of the one or more second network entities. In some aspects, the first network entity monitors candidate measurement resources within time windows allocated for CLI measurement. In some aspects, the time windows are defined by at least one of a sensing time duration, periodicity, or offset for transmission of measurement RS.

FIG. 15 depicts aspects of an example communications device 1500. In some aspects, communications device 1500 is a second network entity, such as BS 102 described above with respect to FIGS. 1 and 3.

The communications device 1500 includes a processing system 1505 coupled to the transceiver 1545 (e.g., a transmitter and/or a receiver) and/or a network interface 1555. The transceiver 1545 is configured to transmit and receive signals for the communications device 1500 via the antenna 1550, such as the various signals as described herein. The network interface 1555 is configured to obtain and send signals for the communications device 1500 via communication link(s), such as a backhaul link, midhaul link, and/or fronthaul link as described herein, such as with respect to FIG. 2. The processing system 1505 may be configured to perform processing functions for the communications device 1500, including processing signals received and/or to be transmitted by the communications device 1500.

The processing system 1505 includes one or more processors 1510. In various aspects, one or more processors 1510 may be representative of one or more of receive processor 338, transmit processor 320, TX MIMO processor 330, and/or controller/processor 340, as described with respect to FIG. 3. The one or more processors 1510 are coupled to a computer-readable medium/memory 1525 via a bus 1540. In certain aspects, the computer-readable medium/memory 1525 is configured to store instructions (e.g., computer-executable code) that when executed by the one or more processors 1510, cause the one or more processors 1510 to perform the method 1200 described with respect to FIG. 12, or any aspect related to it. Note that reference to a processor of communications device 1500 performing a function may include one or more processors 1510 of communications device 1500 performing that function.

In the depicted example, the computer-readable medium/memory 1525 stores code (e.g., executable instructions), such as configuration information code 1530 and configuration adjustment request code 1535. Processing of the configuration information code 1530 and configuration adjustment request code 1535 may cause the communications device 1500 to perform the method 1200 described with respect to FIG. 12, or any aspect related to it.

The one or more processors 1510 include circuitry configured to implement (e.g., execute) the code stored in the computer-readable medium/memory 1525, including circuitry such as configuration information circuitry 1515 and configuration adjustment request circuitry 1520. Processing with configuration information circuitry 1515 and configuration adjustment request circuitry 1520 may cause the communications device 1500 to perform the method 1200 as described with respect to FIG. 12, or any aspect related to it.

Various components of the communications device 1500 may provide means for performing the method 1200 as described with respect to FIG. 12, or any aspect related to it. Means for transmitting, sending or outputting for transmission may include transceivers 332 and/or antenna(s) 334 of the BS 102 illustrated in FIG. 3 and/or the transceiver 1545 and the antenna 1550 of the communications device 1500 in FIG. 15. Means for receiving or obtaining may include transceivers 332 and/or antenna(s) 334 of the BS 102 illustrated in FIG. 3 and/or the transceiver 1545 and the antenna 1550 of the communications device 1500 in FIG. 15.

According to some aspects, configuration information circuitry 1515 obtains information regarding a first configuration for transmission of measurement RS from a first network entity.

According to some aspects, configuration adjustment request circuitry 1520 transmits a request, to the first network entity, for adjustment of the first configuration, based on a comparison of the first configuration with a second configuration for transmission of measurement RS by a second network entity or another network entity. In some aspects, the request is for adjustment of the first configuration to avoid collision of measurement RS transmissions from the first network entity with RS transmissions from the second network entity or the other network entity.

In some aspects, the first configuration and the one or more second configurations indicate at least one of a measurement RS periodicity, measurement RS pattern, or measurement RS resources. In some examples, configuration information circuitry 1515 obtains the information regarding the first configuration from the first network entity. In some aspects, the first and second network entities comprise a first DU and a second DU. In some aspects, obtaining the first configuration involves signaling between the first DU and a CU, wherein at least the second DU belongs to the CU. In some aspects, the CU adjusts the first configuration based on the information regarding the one or more second configurations for transmission of measurement RS by one or more second network entities. In some aspects, if the first DU and second DU belong to different CUs, obtaining the first configuration also involves signaling between the different CUs to obtain the information regarding the one or more second configurations for transmission of measurement RS by one or more second network entities. In some aspects, obtaining the information regarding the first configuration comprises monitoring candidate measurement RS resources. In some aspects, the second network entity monitors candidate measurement resources within time windows allocated for CLI measurement. In some aspects, the time windows are defined by at least one of a sensing time duration, periodicity, or offset for transmission of measurement RS.

FIG. 16 depicts aspects of an example communications device 1600. In some aspects, communications device 1600 is a CU, such as BS 102 described above with respect to FIGS. 1 and 3.

The communications device 1600 includes a processing system 1605 coupled to the transceiver 1645 (e.g., a transmitter and/or a receiver) and/or a network interface 1655. The transceiver 1645 is configured to transmit and receive signals for the communications device 1600 via the antenna 1650, such as the various signals as described herein. The network interface 1655 is configured to obtain and send signals for the communications device 1600 via communication link(s), such as a backhaul link, midhaul link, and/or fronthaul link as described herein, such as with respect to FIG. 2. The processing system 1605 may be configured to perform processing functions for the communications device 1600, including processing signals received and/or to be transmitted by the communications device 1600.

The processing system 1605 includes one or more processors 1610. In various aspects, one or more processors 1610 may be representative of one or more of receive processor 338, transmit processor 320, TX MIMO processor 330, and/or controller/processor 340, as described with respect to FIG. 3. The one or more processors 1610 are coupled to a computer-readable medium/memory 1625 via a bus 1640. In certain aspects, the computer-readable medium/memory 1625 is configured to store instructions (e.g., computer-executable code) that when executed by the one or more processors 1610, cause the one or more processors 1610 to perform the method 1300 described with respect to FIG. 13, or any aspect related to it. Note that reference to a processor of communications device 1600 performing a function may include one or more processors 1610 of communications device 1600 performing that function.

In the depicted example, the computer-readable medium/memory 1625 stores code (e.g., executable instructions), such as network configuration determination code 1630 and network configuration indication code 1635. Processing of the network configuration determination code 1630 and network configuration indication code 1635 may cause the communications device 1600 to perform the method 1300 described with respect to FIG. 13, or any aspect related to it.

The one or more processors 1610 include circuitry configured to implement (e.g., execute) the code stored in the computer-readable medium/memory 1625, including circuitry such as network configuration determination circuitry 1615 and network configuration indication circuitry 1620. Processing with network configuration determination circuitry 1615 and network configuration indication circuitry 1620 may cause the communications device 1600 to perform the method 1300 as described with respect to FIG. 13, or any aspect related to it.

Various components of the communications device 1600 may provide means for performing the method 1300 as described with respect to FIG. 13, or any aspect related to it. Means for transmitting, sending or outputting for transmission may include transceivers 332 and/or antenna(s) 334 of the BS 102 illustrated in FIG. 3 and/or the transceiver 1645 and the antenna 1650 of the communications device 1600 in FIG. 16. Means for receiving or obtaining may include transceivers 332 and/or antenna(s) 334 of the BS 102 illustrated in FIG. 3 and/or the transceiver 1645 and the antenna 1650 of the communications device 1600 in FIG. 16.

According to some aspects, network configuration determination circuitry 1615 determines a first configuration for transmission of measurement RS from a first network entity, based on information regarding one or more second configurations for transmission of measurement RS from one or more second network entities.

According to some aspects, network configuration indication circuitry 1620 transmits information regarding the first configuration to the first network entity. In some examples, network configuration indication circuitry 1620 transmits information regarding the second configuration to the second network entity.

In some aspects, the first configuration and the one or more second configurations indicate at least one of a measurement RS periodicity, measurement RS pattern, or measurement RS resources. In some aspects, determining the first configuration comprises adjusting the first configuration to avoid collision of measurement RS transmissions from the first network entity with RS transmissions from the one or more second network entities. In some aspects, determining the first configuration comprises adjusting the first configuration to enable measurement RS transmissions from the first network entity to be received by multiple of the one or more second network entities. In some aspects, the first and second network entities comprise first and second DU.

EXAMPLE CLAUSES

Implementation examples are described in the following numbered clauses:

Clause 1: A method for wireless communications by a first network entity, comprising: obtaining a first configuration for transmission of measurement RS by the first network entity, wherein the first configuration is adjusted based on information regarding one or more second configurations for transmission of measurement RS by one or more second network entities; and participating in a CLI measurement procedure, in accordance with the first configuration.

Clause 2: The method of Clause 1, wherein participating in the CLI measurement procedure comprises at least one of: scheduling measurement RS transmissions, in accordance with the first configuration; or scheduling measurement RS reception, in accordance with the first configuration.

Clause 3: The method of any one of Clauses 1 and 2, wherein the first configuration and the one or more second configurations indicate at least one of a measurement RS periodicity, measurement RS pattern, or measurement RS resources.

Clause 4: The method of any one of Clauses 1-3, further comprising: adjusting the first configuration, based on the information regarding the one or more second configurations, to avoid collision of measurement RS transmissions from the first network entity with RS transmissions from the one or more second network entities.

Clause 5: The method of any one of Clauses 1-4, further comprising: adjusting the first configuration, based on the information regarding the one or more second configurations, to enable measurement RS transmissions from the first network entity to be received by multiple of the one or more second network entities.

Clause 6: The method of any one of Clauses 1-5, further comprising: obtaining the information regarding the one or more second configurations from the one or more second network entities.

Clause 7: The method of Clause 6, further comprising: transmitting information regarding the first configuration to one or more of the second network entities; receiving a request, from one or more of the second network entities, to adjust the first configuration; and adjusting the first configuration in response to the request.

Clause 8: The method of any one of Clauses 1-7, wherein the first and second network entities comprise a first DU and a second DU.

Clause 9: The method of Clause 8, wherein: obtaining the first configuration involves signaling between the first DU and a CU via a backhaul interface, wherein the first DU belongs to the CU; and the CU adjusts the first configuration based on the information regarding the one or more second configurations for transmission of measurement RS by one or more second network entities.

Clause 10: The method of Clause 9, wherein if the first DU and the second DU belong to different CUs, obtaining the first configuration also involves signaling between the different CUs to obtain the information regarding the one or more second configurations for transmission of measurement RS by one or more second network entities.

Clause 11: The method of any one of Clauses 1-10, further comprising: obtaining the information regarding the one or more second configurations by monitoring candidate measurement RS resources.

Clause 12: The method of Clause 11, wherein participating in the CLI measurement procedure comprises: transmitting measurement RS on a candidate measurement RS resources after determining that candidate measurement RS resource is unoccupied by any of the one or more second network entities.

Clause 13: The method of Clause 11, wherein the first network entity monitors candidate measurement resources within time windows allocated for CLI measurement.

Clause 14: The method of Clause 13, wherein the time windows are defined by at least one of a sensing time duration, periodicity, or offset for transmission of measurement RS.

Clause 15: A method for wireless communications by a second network entity, comprising: obtaining information regarding a first configuration for transmission of measurement RS from a first network entity; and transmitting a request, to the first network entity, for adjustment of the first configuration, based on a comparison of the first configuration with a second configuration for transmission of measurement RS by a second network entity or another network entity.

Clause 16: The method of Clause 15, wherein the first configuration and the one or more second configurations indicate at least one of a measurement RS periodicity, measurement RS pattern, or measurement RS resources.

Clause 17: The method of any one of Clauses 15 and 16, wherein the request is for adjustment of the first configuration to avoid collision of measurement RS transmissions from the first network entity with RS transmissions from the second network entity or the other network entity.

Clause 18: The method of any one of Clauses 15-17, further comprising: obtaining the information regarding the first configuration from the first network entity.

Clause 19: The method of any one of Clauses 15-18, wherein the first and second network entities comprise a first DU and a second DU.

Clause 20: The method of Clause 19, wherein: obtaining the first configuration involves signaling between the first DU and a CU, wherein at least the second DU belongs to the CU; and the CU adjusts the first configuration based on the information regarding the one or more second configurations for transmission of measurement RS by one or more second network entities.

Clause 21: The method of Clause 20, wherein if the first DU and second DU belong to different CUs, obtaining the first configuration also involves signaling between the different CUs to obtain the information regarding the one or more second configurations for transmission of measurement RS by one or more second network entities.

Clause 22: The method of any one of Clauses 15-21, wherein obtaining the information regarding the first configuration comprises monitoring candidate measurement RS resources.

Clause 23: The method of Clause 22, wherein the second network entity monitors candidate measurement resources within time windows allocated for CLI measurement.

Clause 24: The method of Clause 23, wherein the time windows are defined by at least one of a sensing time duration, periodicity, or offset for transmission of measurement RS.

Clause 25: A method for wireless communications by a CU, comprising: determining a first configuration for transmission of measurement RS from a first network entity, based on information regarding one or more second configurations for transmission of measurement RS from one or more second network entities; and transmitting information regarding the first configuration to the first network entity.

Clause 26: The method of Clause 25, further comprising: transmitting information regarding the second configuration to the second network entity.

Clause 27: The method of any one of Clauses 25 and 26, wherein the first configuration and the one or more second configurations indicate at least one of a measurement RS periodicity, measurement RS pattern, or measurement RS resources.

Clause 28: The method of any one of Clauses 25-27, wherein determining the first configuration comprises adjusting the first configuration to avoid collision of measurement RS transmissions from the first network entity with RS transmissions from the one or more second network entities.

Clause 29: The method of any one of Clauses 25-28, wherein determining the first configuration comprises adjusting the first configuration to enable measurement RS transmissions from the first network entity to be received by multiple of the one or more second network entities.

Clause 30: The method of any one of Clauses 25-29, wherein the first and second network entities comprise first and second DU.

Clause 31: A processing system, comprising: a memory comprising computer-executable instructions; one or more processors configured to execute the computer-executable instructions and cause the processing system to perform a method in accordance with any one of Clauses 1-30.

Clause 32: A processing system, comprising means for performing a method in accordance with any one of Clauses 1-30.

Clause 33: A non-transitory computer-readable medium comprising computer-executable instructions that, when executed by one or more processors of a processing system, cause the processing system to perform a method in accordance with any one of Clauses 1-30.

Clause 34: A computer program product embodied on a computer-readable storage medium comprising code for performing a method in accordance with any one of Clauses 1-30.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication by a first network entity, comprising:
    obtaining a first configuration for transmission of measurement reference signals (RS) by the first network entity, wherein the first configuration is adjusted based on information regarding one or more second configurations for transmission of measurement RS by one or more second network entities; and
    participating in a cross link interference (CLI) measurement procedure, in accordance with the first configuration.

2. The method of claim 1, wherein participating in the CLI measurement procedure comprises at least one of:
    scheduling measurement RS transmissions, in accordance with the first configuration; or
    scheduling measurement RS reception, in accordance with the first configuration.

3. The method of claim 1, wherein the first configuration and the one or more second configurations indicate at least one of a measurement RS periodicity, measurement RS pattern, or measurement RS resources.

4. The method of claim 1, further comprising adjusting the first configuration, based on the information regarding the one or more second configurations, to avoid collision of measurement RS transmissions from the first network entity with RS transmissions from the one or more second network entities.

5. The method of claim 1, further comprising adjusting the first configuration, based on the information regarding the one or more second configurations, to enable measurement RS transmissions from the first network entity to be received by multiple of the one or more second network entities.

6. The method of claim 1, further comprising obtaining the information regarding the one or more second configurations from the one or more second network entities.

7. The method of claim 6, further comprising:
    transmitting information regarding the first configuration to one or more of the second network entities;
    receiving a request, from one or more of the second network entities, to adjust the first configuration; and
    adjusting the first configuration in response to the request.

8. The method of claim 1, wherein:
    the first network entity and the second network entities comprise a first distributed unit (DU) and a second DU.

9. The method of claim 8, wherein:
    obtaining the first configuration involves signaling between the first DU and a central unit (CU) via a backhaul interface, wherein the first DU belongs to the CU; and
    the CU adjusts the first configuration based on the information regarding the one or more second configurations for transmission of measurement RS by one or more second network entities.

10. The method of claim 9, wherein:
    if the first DU and second DU belong to different CUs, obtaining the first configuration also involves signaling between the different CUs to obtain the information regarding the one or more second configurations for transmission of measurement RS by one or more second network entities.

11. The method of claim 1, further comprising
    obtaining the information regarding the one or more second configurations by monitoring candidate measurement RS resources.

12. The method of claim 11, wherein participating in the CLI measurement procedure comprises:
    transmitting measurement RS on a candidate measurement RS resources after determining that candidate measurement RS resource is unoccupied by any of the one or more second network entities.

13. The method of claim 11, wherein the first network entity monitors candidate measurement resources within time windows allocated for CLI measurement.

14. The method of claim 13, wherein the time windows are defined by at least one of a sensing time duration, periodicity, or offset for transmission of measurement RS.

15. A method of wireless communication by a second network entity, comprising:
    obtaining information regarding a first configuration for transmission of measurement reference signals (RS) by a first network entity; and
    transmitting a request, to the first network entity, for adjustment of the first configuration, based on a comparison of the first configuration with a second configuration for transmission of measurement RS by the second network entity or another network entity.

16. The method of claim 15, wherein the first configuration and the second configuration indicate at least one of a measurement RS periodicity, measurement RS pattern, or measurement RS resources.

17. The method of claim 15, wherein the request is for adjustment of the first configuration to avoid collision of measurement RS transmissions from the first network entity with RS transmissions from the second network entity or the other network entity.

18. The method of claim 15, further comprising obtaining, from the first network entity, the information regarding the first configuration.

19. The method of claim 15, wherein:
    the first network entity and the second network entity comprise a first distributed unit and a second distributed unit (DU).

20. The method of claim 19, wherein:
    obtaining the first configuration involves signaling between the first DU and a central unit (CU), wherein at least the second DU belongs to the CU; and
    the CU adjusts the first configuration based on the information regarding the second configuration for transmission of measurement RS by one or more second network entities.

21. The method of claim 20, wherein:
    if the first DU and second DU belong to different CUs, obtaining the first configuration also involves signaling between the different CUs to obtain the information regarding the second configuration for transmission of measurement RS by one or more second network entities.

22. The method of claim 15, wherein:
    obtaining the information regarding the first configuration comprises monitoring candidate measurement RS resources.

23. The method of claim 22, wherein the second network entity monitors candidate measurement resources within time windows allocated for CLI measurement.

24. The method of claim 23, wherein the time windows are defined by at least one of a sensing time duration, periodicity, or offset for transmission of measurement RS.

25. A method of wireless communication by a central unit (CU), comprising:
- determining a first configuration for transmission of measurement reference signals (RS) by a first network entity, based on information regarding one or more second configurations for transmission of measurement RS by one or more second network entities, wherein determining the first configuration comprises adjusting the first configuration to avoid collision of measurement RS transmissions from the first network entity with RS transmissions from the one or more second network entities; and
- transmitting information regarding the first configuration to the first network entity.

26. The method of claim 25, further comprising transmitting information regarding the one or more second configurations to the second network entities.

27. The method of claim 25, wherein the first configuration and the one or more second configurations indicate at least one of a measurement RS periodicity, measurement RS pattern, or measurement RS resources.

28. The method of claim 25, wherein determining the first configuration comprises adjusting the first configuration to enable measurement RS transmissions from the first network entity to be received by multiple of the one or more second network entities.

29. The method of claim 25, wherein:
- the first network entity and the second network entities comprise first and second distributed units (DUs).

* * * * *